(12) United States Patent
Dudley et al.

(10) Patent No.: US 10,787,358 B2
(45) Date of Patent: Sep. 29, 2020

(54) CONTROL SYSTEMS FOR LIQUID PRODUCT DELIVERY VEHICLES

(71) Applicant: Knappco, LLC, Kansas City, MO (US)

(72) Inventors: Mark Dudley, Kansas City, MO (US); Erik Bjornebo, Kansas City, MO (US); Randy Robinson, Smithville, MO (US)

(73) Assignee: Knappco, LLC, Hamilton, OH (US)

( * ) Notice: Subject to any disclaimer, the term of this patent is extended or adjusted under 35 U.S.C. 154(b) by 7 days.

(21) Appl. No.: 16/154,185

(22) Filed: Oct. 8, 2018

(65) Prior Publication Data

US 2019/0106318 A1 Apr. 11, 2019

Related U.S. Application Data

(60) Provisional application No. 62/569,733, filed on Oct. 9, 2017.

(51) Int. Cl.
*B67D 7/36* (2010.01)
*B67D 7/14* (2010.01)
(Continued)

(52) U.S. Cl.
CPC .............. *B67D 7/145* (2013.01); *B60P 3/228* (2013.01); *B60P 3/2245* (2013.01); *B67D 7/348* (2013.01);
(Continued)

(58) Field of Classification Search
CPC .......... B67D 7/145; B67D 7/348; B67D 7/73; B67D 7/72; B67D 7/362; B67D 7/342;
(Continued)

(56) References Cited

U.S. PATENT DOCUMENTS

| 4,469,149 A | 9/1984 | Walkey et al. |
| 4,838,323 A | 6/1989 | Watts |

(Continued)

FOREIGN PATENT DOCUMENTS

| AU | 2007200878 A1 | 9/2007 |
| CN | 101789093 A | 7/2010 |

(Continued)

OTHER PUBLICATIONS

International Preliminary Report on Patentability relating to PCT/US2013/069203 filed Nov. 8, 2013, dated May 21, 2015.
(Continued)

*Primary Examiner* — Craig M Schneider
*Assistant Examiner* — Jason K Niesz
(74) *Attorney, Agent, or Firm* — Dinsmore & Shohl LLP

(57) ABSTRACT

A product delivery vehicle system includes a product delivery vehicle with at least one tank compartment. The system includes an internal valve fluidly coupled to the tank compartment, a control valve, and an air system comprising a main air valve and a solenoid valve fluidly coupled to the main air valve and to the internal valve. The solenoid valve is operable to open and close the internal valve. The system includes an electronic control unit communicatively coupled to the control valve, the main air valve, and the solenoid valve. The system includes a tank tag reader operable to read a tank tag and transmit a tank tag indicator associated with the tank tag, the tank tag indicator indicative of a stored liquid type in a distribution tank. The electronic control unit may maintain the internal valve closed and the control valve locked when a product type mismatch is detected.

20 Claims, 11 Drawing Sheets

(51) Int. Cl.
*B67D 7/34* (2010.01)
*B60P 3/22* (2006.01)
*B67D 7/72* (2010.01)
*F17C 13/00* (2006.01)

(52) U.S. Cl.
CPC .............. *B67D 7/362* (2013.01); *B67D 7/72* (2013.01); *B67D 7/342* (2013.01); *F17C 13/002* (2013.01); *F17C 2270/0171* (2013.01)

(58) Field of Classification Search
CPC ...... B60P 3/228; B60P 3/2245; F17C 13/002; F17C 2270/0171
See application file for complete search history.

(56) References Cited

U.S. PATENT DOCUMENTS

| | | |
|---|---|---|
| 5,209,275 A | 5/1993 | Jyuji et al. |
| 5,309,957 A | 5/1994 | Yasushi |
| 5,349,994 A | 9/1994 | Koeninger |
| 5,460,210 A | 10/1995 | Koeninger |
| 5,507,326 A | 4/1996 | Cadman et al. |
| 5,515,890 A | 5/1996 | Koeninger |
| 5,604,681 A | 2/1997 | Koeninger |
| 5,605,182 A | 2/1997 | Oberrecht et al. |
| 5,654,497 A | 8/1997 | Hoffheins et al. |
| 5,655,577 A | 8/1997 | Loen et al. |
| 5,722,469 A | 3/1998 | Tuminaro |
| 5,875,921 A | 3/1999 | Osgar et al. |
| 5,954,101 A | 9/1999 | Drube et al. |
| 6,149,033 A | 11/2000 | Poleshuk |
| 6,186,196 B1 | 2/2001 | Leigh |
| 6,209,576 B1 | 4/2001 | Davis |
| 6,237,647 B1 | 5/2001 | Pong et al. |
| 6,244,287 B1 | 6/2001 | Hill et al. |
| 6,341,629 B1 | 1/2002 | Clark et al. |
| 6,347,723 B1 | 2/2002 | Barlian et al. |
| 6,394,150 B1 | 5/2002 | Haimovich et al. |
| 6,616,036 B2 | 9/2003 | Streicher et al. |
| 6,622,758 B2 | 9/2003 | Drube |
| 6,649,829 B2 | 11/2003 | Garber et al. |
| 6,897,374 B2 | 5/2005 | Garber et al. |
| 7,012,536 B2 | 3/2006 | McConnel et al. |
| 7,188,771 B2 | 3/2007 | Poulter |
| 7,394,375 B2 | 7/2008 | Johnson |
| 7,628,182 B2 | 12/2009 | Poulter et al. |
| 7,647,954 B2 | 1/2010 | Garber et al. |
| 7,841,357 B2 | 11/2010 | Rankin |
| 8,051,882 B2 | 11/2011 | Koeninger et al. |
| 8,261,784 B2 | 9/2012 | Gerard et al. |
| 8,593,290 B2 | 11/2013 | Hunter et al. |
| 8,678,050 B2 | 3/2014 | Dobson et al. |
| 9,499,389 B2 | 11/2016 | Evans |
| 9,823,665 B2 * | 11/2017 | Finnell .................. B67D 7/342 |
| 10,207,912 B2 * | 2/2019 | Nelson .................... B67D 7/04 |
| 2004/0085200 A1 | 5/2004 | McConnel et al. |
| 2005/0139286 A1 | 6/2005 | Poulter et al. |
| 2006/0157148 A1 | 7/2006 | Hillam et al. |
| 2007/0198186 A1 | 8/2007 | Realini et al. |
| 2010/0023170 A1 | 1/2010 | Sherwood |
| 2010/0089486 A1 | 4/2010 | Koeninger et al. |
| 2010/0141483 A1 | 6/2010 | Thacher et al. |
| 2010/0280670 A1 | 11/2010 | Haul |
| 2011/0040503 A1 | 2/2011 | Rogers et al. |
| 2011/0120589 A1 | 5/2011 | Evans |
| 2012/0158192 A1 | 6/2012 | Sherwood |
| 2014/0129038 A1 | 5/2014 | Finnell et al. |
| 2014/0316589 A1 | 10/2014 | Lichtash |
| 2015/0090363 A1 | 4/2015 | Evans |
| 2016/0130130 A1 | 5/2016 | Nelson et al. |
| 2017/0144878 A1 | 5/2017 | Koeninger et al. |

FOREIGN PATENT DOCUMENTS

| | | |
|---|---|---|
| CN | 103049841 A | 4/2013 |
| CN | 204400600 U | 6/2015 |
| DE | 102014013310 A1 | 3/2016 |
| EP | 0546782 A1 | 6/1993 |
| EP | 0568837 A2 | 11/1993 |
| EP | 0518662 B1 | 5/1995 |
| EP | 0805121 B1 | 7/2002 |
| EP | 1832548 A1 | 9/2007 |
| EP | 1354847 B1 | 7/2008 |
| EP | 2234042 A1 | 9/2010 |
| FR | 2726910 A1 | 5/1996 |
| FR | 2878516 A1 | 6/2006 |
| GB | 2293658 B | 2/1999 |
| GB | 2416756 B | 11/2008 |
| JP | S59102629 A | 6/1984 |
| JP | S60252244 A | 12/1985 |
| JP | 06312795 A | 11/1994 |
| JP | 07242144 A | 9/1995 |
| JP | H07315497 A | 12/1995 |
| JP | H082597 A | 1/1996 |
| JP | 09048500 A | 2/1997 |
| WO | WO0050335 A1 | 8/2000 |
| WO | 2010082809 A1 | 7/2010 |
| WO | 2012031323 A1 | 3/2012 |
| WO | 2012052752 A2 | 4/2012 |
| WO | 2013023129 A1 | 2/2013 |
| WO | 2016073267 A1 | 5/2016 |

OTHER PUBLICATIONS

Alfons Haar, SPDS-Sealed Parcel Delivery System, "Automatic recognition of tampering: No additional analysis of report data in the office"; [online]. Retrieved from the Internet: www.alfons-haar. de.; (2 pages).
Alfons Haar, PreciCONTROL-Application COP SPDS, DTMQ, MID, FTL, "Automation in tank truck construction: Minimizes costs, weight, installation and maintenance"; [online]. Retrieved from the Internet: www.alfons-haar.de.; (2 pages).
Liquip International, Downstream News, Issue 4, Apr. 2007; (10 pages).
Civacon, The Smartlok System, "The economical reliable way to strengthen the weak link in your blending process control", 1994; (4 pages).
Civacon, "Strengthen the weak link in your blending process control", 1994; (2 pages).
Civacon, The Smartlok System, "Coupling verification system by Civacon", Jan. 1995; (9 pages).
Measurement Specialties, "Preliminary Specification—FPS2800B12C4—Fluid Property Sensor Module", www.meas-spec. com; Dec. 2009; (pp. 1-5).
Sening Nomix, "Cross-Over Prevention", FMC Technologies Measurement Solutions, Inc., Apr. 2009; (4 pages).
Civacon, "Say goodbye to cross contamination: The Civaflo manifold system"; (4 pages).
Communication relating to the results of the Partial International Search dated Jan. 22, 2014, for International Patent Application No. PCT/US2013/069203 filed Nov. 8, 2013.
International Search Report and Written Opinion pertaining to Application No. PCT/US2013/069203 filed Nov. 8, 2013 (26 pages).
Dixon Bayco, "SureDrop", 2017, Retrieved from the Internet: https://china.dixonvalve.com/sites/default/files/downloadable_resources/product_literature/Suredrop_2017.pdf, 8 pages.
Invitation to Pay Additional Fees pertaining to Application No. PCT/US2017/056137 filed on Oct. 11, 2017; dated Jan. 18, 2018; 47 pages.
Berrys Technologies Ltd., "Midas—Misfuel / Crossover Identification and Avoidance System", 2018, Retrieved from the Internet: https://berrysusa.com/products/midas-elbow, 5 pages.
International Search Report and Written Opinion dated Mar. 31, 2016 for PCT/US2015/057987 filed Oct. 29, 2015. pp. 1-17.
'Custody Transfer for Fuel Tankers: Dezidata Electronic Dipstick System. Retrieved Oct. 22, 2015, from http://www.gasso.com/sites/gasso.com/files/Gasso_Dezi_Data.pdf (8 pages).

(56) References Cited

OTHER PUBLICATIONS

International Search Report and Written Opinion pertaining to Application No. PCT/US2018/054811 filed Oct. 8, 2018 (17 pages).

\* cited by examiner

CONTROL SYSTEMS FOR LIQUID PRODUCT DELIVERY VEHICLES

CROSS-REFERENCE TO RELATED APPLICATIONS

This application claims the benefit of priority under 35 U.S.C. § 120 of U.S. Provisional Application No. 62/569,733, entitled "Control Systems for Liquid Product Delivery Vehicles," filed Oct. 9, 2017, the contents of which are hereby incorporated by reference herein in their entirety.

BACKGROUND

Field

Embodiments provided herein generally relate to control systems, and more specifically, to integrated control systems for liquid product transport vehicles.

Technical Background

Liquid transport vehicles include multiple systems for controlling and/or monitoring the processes of loading liquid materials onto the liquid transport vehicle or unloading the liquid material from the liquid transport vehicle to a delivery tank. These multiple systems often include a crossover protection system, overfill protection system, air system, asset management system, and other systems that control operations of the liquid transport vehicles. For conventional liquid transport vehicles, these multiple systems may be independent of each other. It may be desirable for each of these independent systems to be integrated together into a single control system for controlling operation of the liquid transport vehicle. Accordingly, a need exists for crossover protection system graphical user interfaces.

SUMMARY

In one embodiment, a product delivery vehicle system includes a product delivery vehicle comprising at least one tank compartment and an internal valve fluidly coupled to the at least one tank compartment. The internal valve has a normally closed configuration. The product delivery vehicle system further includes a control valve fluidly coupled to the internal valve, the control valve operable to control a flow of liquid product from the at least one tank compartment, and an air system that includes a main air valve and at least one solenoid valve fluidly coupled to the main air valve and to the internal valve. The solenoid valve is operable to deliver compressed air to the internal valve to transition the internal valve from a normally closed configuration to an open configuration. The product delivery vehicle system may further include an electronic control unit comprising a processor, a memory module communicatively coupled to the processor, and machine readable instructions stored in the at least one memory module. The electronic control unit is communicatively coupled to the control valve, the main air valve, and the at least one solenoid valve. The product delivery vehicle system may further include a tank tag reader operable to read a tank tag and transmit a tank tag indicator associated with the tank tag, the tank tag indicator indicative of a stored liquid type in a distribution tank. The machine readable instructions, when executed by the processor, may cause the electronic control unit to receive the tank tag indicator, determine a stored liquid type associated with a distribution tank based on the tank tag indicator, compare the stored liquid type to a transported liquid type of a liquid product stored in the tank compartment, maintain the internal valve in the normally closed configuration when the stored liquid type and the transported liquid type do not match to prevent the flow of liquid product to or from the tank compartment, and when the stored liquid type and the transported liquid type match, receive a user input from the user input device to open the internal valve and transmit an open internal valve signal to the solenoid valve to transition the internal valve from the normally closed configuration to an open configuration, thereby permitting the flow of liquid product to or from the tank compartment.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
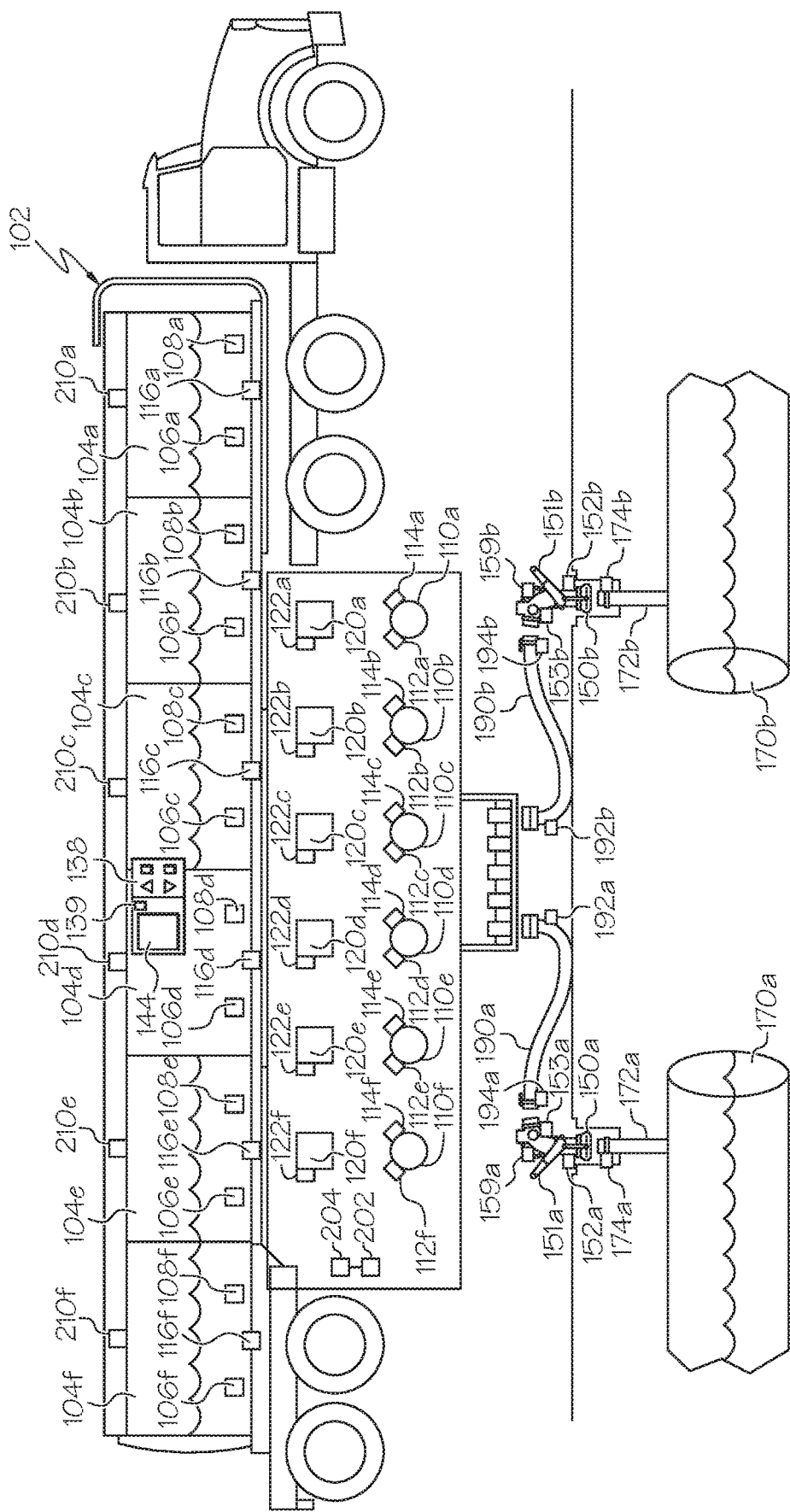
FIG. 1 schematically depicts a product delivery vehicle, tank delivery connectors, and delivery hoses, according to one or more embodiments of the present disclosure.

A product delivery vehicle (e.g., a fuel truck) may deliver liquid (e.g., gasoline or diesel fuel) to a distribution tank (e.g., an underground distribution tank containing gasoline or an underground distribution tank containing diesel fuel) at a distribution facility (e.g., a gas station). Such product delivery vehicles may include multiple tank compartments, each of which contains a different liquid (e.g., a gasoline tank compartment, a diesel tank compartment, etc.). Several distribution tanks may be located at the distribution facility, such as a gasoline distribution tank, a diesel distribution tank, etc. The product delivery vehicle may include a crossover protection system to prevent crossover, cross contamination, or co-mingling of a liquid from a tank compartment of the product delivery vehicle into a distribution tank that contains a different liquid. The product delivery vehicle may also include an overfill protection system to prevent overfilling one or more of the tank compartments during unloading operations. The product delivery vehicle may further include an air system for operating one or more components of the product delivery vehicle. The product delivery vehicle may also include an asset management system or any of a number of additional systems for facilitating transport and delivery of the liquid product. It may be desirable to provide a central liquid product delivery system operable to prevent crossover of materials, operate the air system, prevent overfill of tank compartments, conduct fleet management actions, and control other systems of the product delivery vehicle.

Embodiments described herein include product delivery vehicle systems for operating a product delivery vehicle to load and deliver liquid products. In one or more embodiments, the liquid product delivery system may include a product delivery vehicle having at least one tank compartment and an internal valve fluidly coupled to the tank compartment. The product delivery vehicle system further includes a control valve fluidly coupled to the internal valve and operable to control a flow of liquid product from the tank compartment. The product delivery vehicle system may further include an air system that includes a main air valve and at least one solenoid valve fluidly coupled to the main air valve and to the internal valve. The air system is operable to deliver compressed air to the internal valve to transition the internal valve from a normally closed configuration to an open configuration. The product delivery vehicle system may further include an electronic control unit comprising a processor, a memory module communicatively coupled to the processor, and machine readable instructions stored in the at least one memory module. The electronic control unit is communicatively coupled to the control valve, the main air valve, and the at least one solenoid valve. The product delivery vehicle system may further include a tank tag reader operable to read a tank tag and transmit a tank tag indicator associated with the tank tag, the tank tag indicator indicative of a stored liquid type in a distribution tank. For unloading operations, the product delivery vehicle may receive the tank tag indicator, determine a stored liquid type associated with a distribution tank based on the tank tag indicator, compare the stored liquid type to a transported liquid type of a liquid product stored in the tank compartment to determine a match or mismatch, maintain the internal valve in the normally closed configuration when the stored liquid type and the transported liquid type do not match and receive a user input from the user input device to open the internal valve and transmit an open internal valve signal to the solenoid valve to transition the internal valve from the normally closed configuration to an open configuration, thereby permitting the flow of liquid product to or from the tank compartment.

The liquid product delivery systems allow control of the crossover protection system, the overfill protection system, the air system of the product delivery vehicle. For example, the liquid product delivery systems may allow an operator of the product delivery vehicle to deliver multiple types of fuel or other liquid to distribution tanks at a distribution facility in a quick and efficient manner while mitigating the risk of crossover. The liquid product delivery systems may also enable an operator of the product delivery vehicle to operate the air system of the product delivery vehicle from a central control system without having to toggle manual switches or push buttons common with conventional air systems. The liquid product delivery systems may also enable the operator of the product delivery vehicle to avoid overfilling one or more tank compartments while loading liquid products into the tank compartments of the product delivery vehicle. The liquid product delivery systems may also provide asset management tools to track the performance of the product delivery vehicle.

Referring now to FIG. 1, a product delivery vehicle 102 is depicted that may deliver liquid products from tank compartments of the product delivery vehicle 102 to a first distribution tank 170*a* and a second distribution tank 170*b* at a distribution facility. FIG. 1 also depicts a first delivery hose 190*a*, a second delivery hose 190*b*, a first tank delivery connector 150*a*, and a second tank delivery connector 150*b*, which may be utilized to facilitate the delivery of fluid from the product delivery vehicle 102 to the first distribution tank 170*a* and/or the second distribution tank 170*b*, as will be described further below. The various components of the product delivery vehicle 102, the first delivery hose 190*a*, the second delivery hose 190*b*, the first distribution tank 170*a*, the second distribution tank 170*b*, the first tank delivery connector 150*a*, and the second tank delivery connector 150*b*, will be described in turn.

Still referring to FIG. 1, the product delivery vehicle 102 may include one or a plurality of tank compartments, such as tank compartments 104*a*, . . . , 104*f*, one or a plurality of control valves, such as control valves 110*a*, . . . , 110*f*, one or a plurality of control valve sensors 112*a*, . . . , 112*f*, one or a plurality of hose tag readers 114*a*, . . . , 114*f*, one or a plurality of internal valves, such as internal valves 116*a*, . . . , 116*f*, one or a plurality of solenoid valves 120*a*, . . . , 120*f*, one or a plurality of solenoid valve sensors 122*a*, . . . , 122*f*, a main air input connection 202, a main air valve 204, user input device 138, a magnet 139, and a display 144. The product delivery vehicle 102 may also include one or a plurality of fluid property sensors, such as fluid property sensors 106*a*, . . . , 106*f*, one or a plurality of pressure sensors, such as pressure sensors 108*a*, . . . , 108*f*, or one or a plurality of overfill sensors, such as overfill sensors 210*a*, . . . , 210*f*. The various components and relationships thereof of the product delivery vehicle 102 will now be described.

Still referring to the product delivery vehicle 102 of FIG. 1, the tank compartments 104*a*, . . . , 104*f* may include a first tank compartment 104*a*, a second tank compartment 104*b*, a third tank compartment 104*c*, a fourth tank compartment 104*d*, a fifth tank compartment 104*e*, and a sixth tank compartment 104*f*. In other embodiments, the product delivery vehicle 102 may include more than or less than six tank compartments. Each of the tank compartments may contain a liquid product, such as a particular type of fuel, to be delivered to the distribution tanks 170a, 170b at the distribution facility.

Still referring to FIG. 1, the fluid property sensors (FPS) 106a, . . . , 106f may include a first fluid property sensor 106a, a second fluid property sensor 106b, a third fluid property sensor 106c, a fourth fluid property sensor 106d, a fifth fluid property sensor 106e, and a sixth fluid property sensor 106f. The first fluid property sensor 106a is associated with the first tank compartment 104a. The first fluid property sensor 106a may be positioned to contact fluid contained within the first tank compartment 104a and to output a signal indicative of a sensed fluid property (e.g., a viscosity, a density, a dielectric constant, a temperature, etc.) of the fluid contained within the first tank compartment 104a. In some embodiments, the first fluid property sensor 106a may be positioned in the first tank compartment 104a. In some embodiments, the first fluid property sensor 106a may be positioned in a pipe or conduit fluidly coupled to the first tank compartment 104a, such as a pipe fluidly coupled to a bottom of the first tank compartment 104a.

The second fluid property sensor 106b is associated with the second tank compartment 104b. The second fluid property sensor 106b may be positioned to contact fluid contained within the second tank compartment 104b and to output a signal indicative of a sensed fluid property (e.g., a viscosity, a density, a dielectric constant, a temperature, etc.) of the fluid contained within the second tank compartment 104b. In some embodiments, the second fluid property sensor 106b may be positioned in the second tank compartment 104b. In some embodiments, the second fluid property sensor 106b may be positioned in a pipe or conduit fluidly coupled to the second tank compartment 104b, such as a pipe fluidly coupled to a bottom of the second tank compartment 104b.

The third fluid property sensor 106c is associated with the third tank compartment 104c. The third fluid property sensor 106c may be positioned to contact fluid contained within the third tank compartment 104c and to output a signal indicative of a sensed fluid property (e.g., a viscosity, a density, a dielectric constant, a temperature, etc.) of the fluid contained within the third tank compartment 104c. In some embodiments, the third fluid property sensor 106c may be positioned in the third tank compartment 104c. In some embodiments, the third fluid property sensor 106c may be positioned in a pipe or conduit fluidly coupled to the third tank compartment 104c, such as a pipe fluidly coupled to a bottom of the third tank compartment 104c.

The fourth fluid property sensor 106d is associated with the fourth tank compartment 104d. The fourth fluid property sensor 106d may be positioned to contact fluid contained within the fourth tank compartment 104d and to output a signal indicative of a sensed fluid property (e.g., a viscosity, a density, a dielectric constant, a temperature, etc.) of the fluid contained within the fourth tank compartment 104d. In some embodiments, the fourth fluid property sensor 106d may be positioned in the fourth tank compartment 104d. In some embodiments, the fourth fluid property sensor 106d may be positioned in a pipe or conduit fluidly coupled to the fourth tank compartment 104d, such as a pipe fluidly coupled to a bottom of the fourth tank compartment 104d.

The fifth fluid property sensor 106e is associated with the fifth tank compartment 104e. The fifth fluid property sensor 106e may be positioned to contact fluid contained within the fifth tank compartment 104e and to output a signal indicative of a sensed fluid property (e.g., a viscosity, a density, a dielectric constant, a temperature, etc.) of the fluid contained within the fifth tank compartment 104e. In some embodiments, the fifth fluid property sensor 106e may be positioned in the fifth tank compartment 104e. In some embodiments, the fifth fluid property sensor 106e may be positioned in a pipe or conduit fluidly coupled to the fifth tank compartment 104e, such as a pipe fluidly coupled to a bottom of the fifth tank compartment 104e.

The sixth fluid property sensor 106f is associated with the sixth tank compartment 104f. The sixth fluid property sensor 106f may be positioned to contact fluid contained within the sixth tank compartment 104f and to output a signal indicative of a sensed fluid property (e.g., a viscosity, a density, a dielectric constant, a temperature, etc.) of the fluid contained within the sixth tank compartment 104f. In some embodiments, the sixth fluid property sensor 106f may be positioned in the sixth tank compartment 104f. In some embodiments, the sixth fluid property sensor 106f may be positioned in a pipe or conduit fluidly coupled to the sixth tank compartment 104f, such as a pipe fluidly coupled to a bottom of the sixth tank compartment 104f.

In some embodiments, one or more of the plurality of fluid property sensors 106a, . . . , 106f may be a fluid property sensor as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of fluid property sensors 106a, . . . , 106f is a tuning fork sensor model number FPS2800B12C4 by Measurement Specialties. In other embodiments, one or more than one of the fluid property sensors 106a, . . . , 106f may be an optical fluid sensor as described in U.S. patent application Ser. No. 15/291,178, filed Oct. 12, 2016, entitled "Optical Fluid Sensors for Cross Contamination Control Systems," the entirety of which is incorporated herein by reference. However, it should be understood that other alternative fluid property sensors may be used.

Still referring to FIG. 1, the plurality of pressure sensors 108a, . . . , 108f may include a first pressure sensor 108a, a second pressure sensor 108b, a third pressure sensor 108c, a fourth pressure sensor 108d, a fifth pressure sensor 108e, and a sixth pressure sensor 108f. The first pressure sensor 108a is associated with the first tank compartment 104a. The first pressure sensor 108a may output a signal indicative of a sensed pressure within the first tank compartment 104a, which may be utilized to gauge the approximate level or amount of liquid in the first tank compartment 104a. In some embodiments, the first pressure sensor 108a may be positioned in the first tank compartment 104a. In some embodiments, the first pressure sensor 108a may be positioned in a pipe or conduit fluidly coupled to the first tank compartment 104a, such as a pipe fluidly coupled to a bottom of the first tank compartment 104a.

The second pressure sensor 108b is associated with the second tank compartment 104b. The second pressure sensor 108b may output a signal indicative of a sensed pressure within the second tank compartment 104b, which may be utilized to gauge the approximate level or amount of liquid in the second tank compartment 104b. In some embodiments, the second pressure sensor 108b may be positioned in the second tank compartment 104b. In some embodiments, the second pressure sensor 108b may be positioned in a pipe or conduit fluidly coupled to the second tank compartment 104b, such as a pipe fluidly coupled to a bottom of the second tank compartment 104b.

The third pressure sensor 108c is associated with the third tank compartment 104c. The third pressure sensor 108c may output a signal indicative of a sensed pressure within the third tank compartment 104c, which may be utilized to gauge the approximate level or amount of liquid in the third tank compartment 104c. In some embodiments, the third pressure sensor 108c may be positioned in the third tank compartment 104c. In some embodiments, the third pressure sensor 108c may be positioned in a pipe or conduit fluidly coupled to the third tank compartment 104c, such as a pipe fluidly coupled to a bottom of the third tank compartment 104c.

The fourth pressure sensor 108d is associated with the fourth tank compartment 104d. The fourth pressure sensor 108d may output a signal indicative of a sensed pressure within the fourth tank compartment 104d, which may be utilized to gauge the approximate level or amount of liquid in the fourth tank compartment 104d. In some embodiments, the fourth pressure sensor 108d may be positioned in the fourth tank compartment 104d. In some embodiments, the fourth pressure sensor 108d may be positioned in a pipe or conduit fluidly coupled to the fourth tank compartment 104d, such as a pipe fluidly coupled to a bottom of the fourth tank compartment 104d.

The fifth pressure sensor 108e is associated with the fifth tank compartment 104e. The fifth pressure sensor 108e may output a signal indicative of a sensed pressure within the fifth tank compartment 104e, which may be utilized to gauge the approximate level or amount of liquid in the fifth tank compartment 104e. In some embodiments, the fifth pressure sensor 108e may be positioned in the fifth tank compartment 104e. In some embodiments, the fifth pressure sensor 108e may be positioned in a pipe or conduit fluidly coupled to the fifth tank compartment 104e, such as a pipe fluidly coupled to a bottom of the fifth tank compartment 104e.

The sixth pressure sensor 108f is associated with the sixth tank compartment 104f. The sixth pressure sensor 108f may output a signal indicative of a sensed pressure within the sixth tank compartment 104f, which may be utilized to gauge the approximate level or amount of liquid in the sixth tank compartment 104f. In some embodiments, the sixth pressure sensor 108f may be positioned in the sixth tank compartment 104f. In some embodiments, the sixth pressure sensor 108f may be positioned in a pipe or conduit fluidly coupled to the sixth tank compartment 104f, such as a pipe fluidly coupled to a bottom of the sixth tank compartment 104f.

In some embodiments, one or more of the plurality of pressure sensors 108a, . . . , 108f may be a pressure sensor as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of pressure sensors 108a, . . . , 108f may be a diaphragm pressure sensor, model number 1E/F by Televac. However, it should be understood that alternative pressure sensors may be used, such as, for example, a piezo pressure sensor or an electric pressure sensor.

Still referring to FIG. 1, the plurality of overfill sensors 211a, . . . , 210f may include a first overfill sensor 211a, a second overfill sensor 210b, a third overfill sensor 210c, a fourth overfill sensor 210d, a fifth overfill sensor 210e, and a sixth overfill sensor 210f. The first overfill sensor 211a may associated with the first tank compartment 104a. The first overfill sensor 211a may be operable to determine an overfill condition in the first tank compartment 104a. The first overfill sensor 211a may output or transmit a signal indicative of an overfill condition within the first tank compartment 104a. In some embodiments, the first overfill sensor 211a may be operable to determine a liquid level in the first tank compartment 104a and output or transmit a signal indicative of the liquid level of fluid in the first tank compartment 104a. In some embodiments, the first overfill sensor 210a may be positioned in a top portion of the first tank compartment 104a.

The second overfill sensor 210b may associated with the second tank compartment 104b. The second overfill sensor 210b may be operable to determine an overfill condition in the second tank compartment 104b. The second overfill sensor 210b may output or transmit a signal indicative of an overfill condition within the second tank compartment 104b. In some embodiments, the second overfill sensor 210b may be operable to determine a liquid level in the second tank compartment 104b and output or transmit a signal indicative of the liquid level of fluid in the second tank compartment 104b. In some embodiments, the second overfill sensor 210b may be positioned in a top portion of the second tank compartment 104b.

The third overfill sensor 210c may associated with the third tank compartment 104c. The third overfill sensor 210c may be operable to determine an overfill condition in the third tank compartment 104c. The third overfill sensor 210c may output or transmit a signal indicative of an overfill condition within the third tank compartment 104c. In some embodiments, the third overfill sensor 210c may be operable to determine a liquid level in the third tank compartment 104c and output or transmit a signal indicative of the liquid level of fluid in the third tank compartment 104c. In some embodiments, the third overfill sensor 210c may be positioned in a top portion of the third tank compartment 104c.

The fourth overfill sensor 210d may associated with the fourth tank compartment 104d. The fourth overfill sensor 210d may be operable to determine an overfill condition in the fourth tank compartment 104d. The fourth overfill sensor 210d may output or transmit a signal indicative of an overfill condition within the fourth tank compartment 104d. In some embodiments, the fourth overfill sensor 210d may be operable to determine a liquid level in the fourth tank compartment 104d and output or transmit a signal indicative of the liquid level of fluid in the fourth tank compartment 104d. In some embodiments, the fourth overfill sensor 210d may be positioned in a top portion of the fourth tank compartment 104d.

The fifth overfill sensor 210e may associated with the fifth tank compartment 104e. The fifth overfill sensor 210e may be operable to determine an overfill condition in the fifth tank compartment 104e. The fifth overfill sensor 210e may output or transmit a signal indicative of an overfill condition within the fifth tank compartment 104e. In some embodiments, the fifth overfill sensor 210e may be operable to determine a liquid level in the fifth tank compartment 104e and output or transmit a signal indicative of the liquid level of fluid in the fifth tank compartment 104e. In some embodiments, the fifth overfill sensor 210e may be positioned in a top portion of the fifth tank compartment 104e.

The sixth overfill sensor 210f may associated with the sixth tank compartment 104f. The sixth overfill sensor 210f may be operable to determine an overfill condition in the sixth tank compartment 104f. The sixth overfill sensor 210f may output or transmit a signal indicative of an overfill condition within the sixth tank compartment 104f. In some embodiments, the sixth overfill sensor 210f may be operable to determine a liquid level in the sixth tank compartment 104f and output or transmit a signal indicative of the liquid level of fluid in the sixth tank compartment 104f. In some embodiments, the sixth overfill sensor 210f may be positioned in a top portion of the sixth tank compartment 104f.

In some embodiments, one or more of the plurality of overfill sensors 210a, . . . , 210f may be an overfill probe as described in U.S. Pat. No. 8,593,290, Nov. 26, 2016, entitled "Overfill Detection System for Tank Trucks," the entirety of which is incorporated herein by reference. However, it should be understood that other alternative overfill sensors may be used. In some embodiments, one or more of the plurality of overfill sensors 210a, . . . , 210f may be a level probe, such as point level probe or a continuous level probe. Examples of level probes may include, but are not limited to, ultrasonic, optical, microwave, capacitance, nuclear, or mechanical level probes, or other types of level probe.

Figure 2:
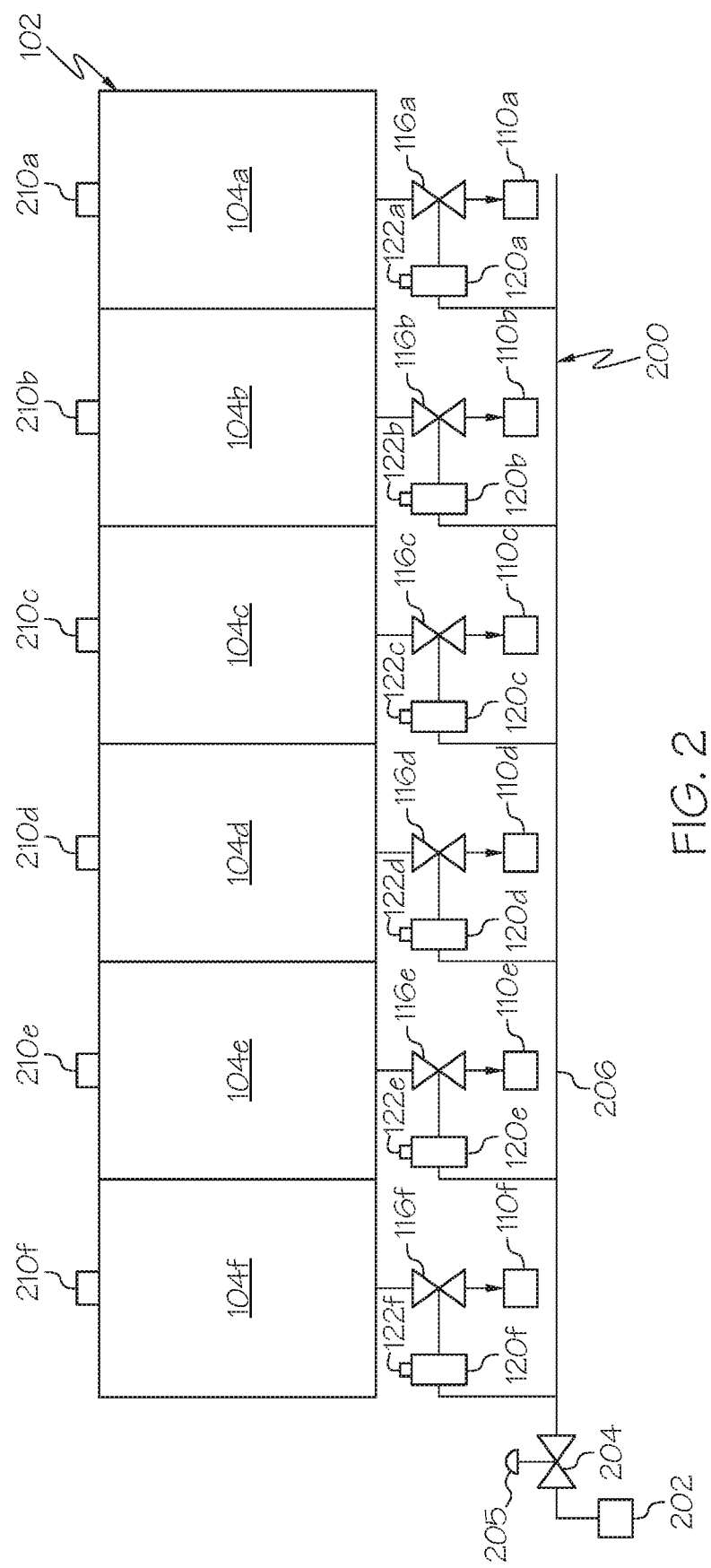
FIG. 2 schematically depicts an air system of the product delivery vehicle of FIG. 1, according to one or more embodiments of the present disclosure.

Still referring to FIGS. 1 and 2, the plurality of internal valves 116a, . . . , 116f may include a first internal valve 116a, a second internal valve 116b, a third internal valve 116c, a fourth internal valve 116d, a fifth internal valve 116e, and a sixth internal valve 116f. The first internal valve 116a may be fluidly coupled to the first tank compartment 104a and may control the release of fluid, such as a liquid product, from the first tank compartment 104a. For example, the fluid may be released from the first tank compartment 104a when the first internal valve 116a is in an open configuration, and fluid may not be released from the first tank compartment 104a when the first internal valve 116a is in a closed configuration. In some embodiments, the first internal valve 116a may have a normally closed configuration. In some embodiments, the first internal valve 116a may be an air operated valve and may be operatively coupled to the air system of the product delivery vehicle 102. In some embodiments, the first internal valve 116a may be an emergency valve.

The second internal valve 116b may be fluidly coupled to the second tank compartment 104b and may control the release of fluid, such as a liquid product, from the second tank compartment 104b. For example, the fluid may be released from the second tank compartment 104b when the second internal valve 116b is in an open configuration, and fluid may not be released from the second tank compartment 104b when the second internal valve 116b is in a closed configuration. In some embodiments, the second internal valve 116b may have a normally closed configuration. In some embodiments, the second internal valve 116b may be an air operated valve and may be operatively coupled to the air system of the product delivery vehicle 102. In some embodiments, the second internal valve 116b may be an emergency valve.

The third internal valve 116c may be fluidly coupled to the third tank compartment 104c and may control the release of fluid, such as a liquid product, from the third tank compartment 104c. For example, the fluid may be released from the third tank compartment 104c when the third internal valve 116c is in an open configuration, and fluid may not be released from the third tank compartment 104c when the third internal valve 116c is in a closed configuration. In some embodiments, the third internal valve 116c may have a normally closed configuration. In some embodiments, the third internal valve 116c may be an air operated valve and may be operatively coupled to the air system of the product delivery vehicle 102. In some embodiments, the third internal valve 116c may be an emergency valve.

The fourth internal valve 116d may be fluidly coupled to the fourth tank compartment 104d and may control the release of fluid, such as a liquid product, from the fourth tank compartment 104d. For example, the fluid may be released from the fourth tank compartment 104d when the fourth internal valve 116d is in an open configuration, and fluid may not be released from the fourth tank compartment 104d when the fourth internal valve 116d is in a closed configuration. In some embodiments, the fourth internal valve 116d may have a normally closed configuration. In some embodiments, the fourth internal valve 116d may be an air operated valve and may be operatively coupled to the air system of the product delivery vehicle 102. In some embodiments, the fourth internal valve 116d may be an emergency valve.

The fifth internal valve 116e may be fluidly coupled to the fifth tank compartment 104e and may control the release of fluid, such as a liquid product, from the fifth tank compartment 104e. For example, the fluid may be released from the fifth tank compartment 104e when the fifth internal valve 116e is in an open configuration, and fluid may not be released from the fifth tank compartment 104e when the fifth internal valve 116e is in a closed configuration. In some embodiments, the fifth internal valve 116e may have a normally closed configuration. In some embodiments, the fifth internal valve 116e may be an air operated valve and may be operatively coupled to the air system of the product delivery vehicle 102. In some embodiments, the fifth internal valve 116e may be an emergency valve.

The sixth internal valve 116f may be fluidly coupled to the sixth tank compartment 104f and may control the release of fluid, such as a liquid product, from the sixth tank compartment 104f. For example, the fluid may be released from the sixth tank compartment 104f when the sixth internal valve 116f is in an open configuration, and fluid may not be released from the sixth tank compartment 104f when the sixth internal valve 116f is in a closed configuration. In some embodiments, the sixth internal valve 116f may have a normally closed configuration. In some embodiments, the sixth internal valve 116f may be an air operated valve and may be operatively coupled to the air system of the product delivery vehicle 102. In some embodiments, the sixth internal valve 116f may be an emergency valve. In some embodiments, one or more of the plurality of control valves 110a, . . . , 110f may be an emergency valve, such as one of the MaxAir series of internal valves by Civacon.

Referring to FIG. 2, the air system 200 of the product transport vehicle 102 may include a main air inlet connection 202, a main air valve 204, a manifold 206 fluidly coupled to the main air valve 204, and the one or a plurality of solenoid valves 120a, . . . , 120f fluidly coupled to the manifold 206. The main air inlet connection 202 may be couplable to a compressed gas source, such as a source of compressed air, or other compressed gas. As used herein, the term "compressed air" is meant to include other gases having compositions that are not the same as air, such as carbon dioxide, nitrogen, argon, inert gases, non-combustible gases, other gases or combinations of gases. The main air valve 204 may be in fluid communication with the main air inlet connection 202. In some embodiments, the main air valve 204 may include an actuator 205 operative to transition the main air valve 204 between an open configuration and a closed configuration. In some embodiments, the main air valve 204 may have a normally closed configuration such that activation of the actuator 205 transitions the main air valve 204 from the closed configuration to the open configuration and deactivation of the actuator 205 transitions the main air valve 204 from the open configuration back to the closed configuration.

The manifold 206 may include a rigid or flexible conduit in fluid communication with the main air valve 204. The manifold 206 may include a plurality of connections from which the manifold 206 may supply the compressed gas to one or a plurality of devices or systems associated with the product delivery vehicle 102. For example, in some embodiments, each of the connections of the manifold 206 may be fluidly coupled to one of the plurality of solenoid valves 120a, ..., 120f to supply the compressed air to the solenoid valve.

Still referring to FIG. 2, the plurality of solenoid valves 120a, ..., 120f may include a first solenoid valve 120a, a second solenoid valve 120b, a third solenoid valve 120c, a fourth solenoid valve 120d, a fifth solenoid valve 120e, and a sixth solenoid valve 120f. In some embodiments, each of the plurality of solenoid valves 120a, ..., 120f may be a pneumatic solenoid valve operable to actuate one of the plurality of internal valves 116a, ..., 116f associated with a corresponding tank compartment 104a, ..., 104f. In some embodiments, each of the plurality of solenoid valves 120a, ..., 120f may be fluidly coupled to the manifold 206 for providing the compressed air to the solenoid valves 120a, ..., 120f.

The first solenoid valve 120a may be associated with the first tank compartment 104a and may control the actuation of the first internal valve 116a associated with the first tank compartment 104a. The first solenoid valve 120a may actuate the first internal valve 116a between the closed configuration and the open configuration of the first internal valve 116a. In some embodiments, the first solenoid valve 120a may have a normally closed configuration in which no compressed air is supplied to the first internal valve 116a when no control signal is provided to the first solenoid valve 120a. The first solenoid valve 120a may include a first solenoid valve sensor 122a positioned proximate to the first solenoid valve 120a. The first solenoid valve sensor 122a may be operable to output a signal indicative of a position or configuration of the first solenoid valve 120a, such as a signal indicative of the first solenoid valve 120a being in an open configuration or a closed configuration.

The second solenoid valve 120b may be associated with the second tank compartment 104b and may control the actuation of the second internal valve 116b associated with the second tank compartment 104b. The second solenoid valve 120b may actuate the second internal valve 116b between the closed configuration and the open configuration of the second internal valve 116b. In some embodiments, the second solenoid valve 120b may have a normally closed configuration in which no compressed air is supplied to the second internal valve 116b when no control signal is provided to the second solenoid valve 120b. The second solenoid valve 120b may include a second solenoid valve sensor 122b positioned proximate to the second solenoid valve 120b. The second solenoid valve sensor 122b may be operable to output a signal indicative of a position or configuration of the second solenoid valve 120b, such as a signal indicative of the second solenoid valve 120b being in an open configuration or a closed configuration.

The third solenoid valve 120c may be associated with the third tank compartment 104c and may control the actuation of the third internal valve 116c associated with the third tank compartment 104c. The third solenoid valve 120c may actuate the third internal valve 116c between the closed configuration and the open configuration of the third internal valve 116c. In some embodiments, the third solenoid valve 120c may have a normally closed configuration in which no compressed air is supplied to the third internal valve 116c when no control signal is provided to the third solenoid valve 120c. The third solenoid valve 120c may include a third solenoid valve sensor 122c positioned proximate to the third solenoid valve 120c. The third solenoid valve sensor 122c may be operable to output a signal indicative of a position or configuration of the third solenoid valve 120c, such as a signal indicative of the third solenoid valve 120c being in an open configuration or a closed configuration.

The fourth solenoid valve 120d may be associated with the fourth tank compartment 104d and may control the actuation of the fourth internal valve 116d associated with the fourth tank compartment 104d. The fourth solenoid valve 120d may actuate the fourth internal valve 116d between the closed configuration and the open configuration of the fourth internal valve 116d. In some embodiments, the fourth solenoid valve 120d may have a normally closed configuration in which no compressed air is supplied to the fourth internal valve 116d when no control signal is provided to the fourth solenoid valve 120d. The fourth solenoid valve 120d may include a fourth solenoid valve sensor 122d positioned proximate to the fourth solenoid valve 120d. The fourth solenoid valve sensor 122d may be operable to output a signal indicative of a position or configuration of the fourth solenoid valve 120d, such as a signal indicative of the fourth solenoid valve 120d being in an open configuration or a closed configuration.

The fifth solenoid valve 120e may be associated with the fifth tank compartment 104e and may control the actuation of the fifth internal valve 116e associated with the fifth tank compartment 104e. The fifth solenoid valve 120e may actuate the fifth internal valve 116e between the closed configuration and the open configuration of the fifth internal valve 116e. In some embodiments, the fifth solenoid valve 120e may have a normally closed configuration in which no compressed air is supplied to the fifth internal valve 116e when no control signal is provided to the fifth solenoid valve 120e. The fifth solenoid valve 120e may include a fifth solenoid valve sensor 122e positioned proximate to the fifth solenoid valve 120e. The fifth solenoid valve sensor 122e may be operable to output a signal indicative of a position or configuration of the fifth solenoid valve 120e, such as a signal indicative of the fifth solenoid valve 120e being in an open configuration or a closed configuration.

The sixth solenoid valve 120f may be associated with the sixth tank compartment 104f and may control the actuation of the sixth internal valve 116f associated with the sixth tank compartment 104f. The sixth solenoid valve 120f may actuate the sixth internal valve 116f between the closed configuration and the open configuration of the sixth internal valve 116f. In some embodiments, the sixth solenoid valve 120f may have a normally closed configuration in which no compressed air is supplied to the sixth internal valve 116f when no control signal is provided to the sixth solenoid valve 120f. The sixth solenoid valve 120f may include a sixth solenoid valve sensor 122f positioned proximate to the sixth solenoid valve 120f. The sixth solenoid valve sensor 122f may be operable to output a signal indicative of a position or configuration of the sixth solenoid valve 120f, such as a signal indicative of the sixth solenoid valve 120f being in an open configuration or a closed configuration.

In some embodiments, one or more of the plurality of solenoid valves 120a, ..., 120f may be a solenoid valve or solenoid valve assembly as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference, though embodiments are not limited thereto.

Still referring to FIG. 2, the plurality of control valves 110a, . . . , 110f may include a first control valve 110a, a second control valve 110b, a third control valve 110c, a fourth control valve 110d, a fifth control valve 110e, and a sixth control valve 110f. The first control valve 110a may be fluidly coupled to the first internal valve 116a, which may be fluidly coupled to the first tank compartment 104a. The first control valve 110a may control the release of fluid from the first tank compartment 104a, such that fluid may be released from the first tank compartment 104a when the first control valve 110a and the first internal valve 116a are in an open configuration and fluid may not be released from the first tank compartment 104a when the first control valve 110a is in a closed configuration. When the first internal valve 116a and the first control valve 110a are both in the open configuration, then the liquid product in the first tank compartment 104a may flow out of the first tank compartment 104a, through the first internal valve 116a, and then through the first control valve 110a. A first control valve sensor 112a may be positioned proximal to the first control valve 110a. The first control valve sensor 112a may output a signal indicative of a position or configuration of the first control valve 110a, such as a signal indicative of the first control valve 110a being in the open configuration or the closed configuration. The first control valve 110a may be opened and closed manually by an operator or automatically (e.g., when the first control valve 110a is actuated by an electronic, pneumatic, magnetic, or electro-mechanical actuator).

The second control valve 110b may be fluidly coupled to the second internal valve 116b, which may be fluidly coupled to the second tank compartment 104b. The second control valve 110b may control the release of fluid from the second tank compartment 104b, such that fluid may be released from the second tank compartment 104b when the second control valve 110b and the second internal valve 116b are in an open configuration and fluid may not be released from the second tank compartment 104b when the second control valve 110b is in a closed configuration. When the second internal valve 116b and the second control valve 110b are both in the open configuration, then the liquid product in the second tank compartment 104b may flow out of the second tank compartment 104b, through the second internal valve 116a, and then through the second control valve 110b. A second control valve sensor 112b may be positioned proximal to the second control valve 110b. The second control valve sensor 112b may output a signal indicative of a position or configuration of the second control valve 110b, such as a signal indicative of the second control valve 110b being in the open configuration or the closed configuration. The second control valve 110b may be opened and closed manually by an operator or automatically (e.g., when the second control valve 110b is actuated by an electronic, pneumatic, magnetic, or electro-mechanical actuator).

The third control valve 110c may be fluidly coupled to the third internal valve 116c, which may be fluidly coupled to the third tank compartment 104c. The third control valve 110c may control the release of fluid from the third tank compartment 104c, such that fluid may be released from the third tank compartment 104c when the third control valve 110c and the third internal valve 116c are in an open configuration and fluid may not be released from the third tank compartment 104c when the third control valve 110c is in a closed configuration. When the third internal valve 116c and the third control valve 110c are both in the open configuration, then the liquid product in the third tank compartment 104c may flow out of the third tank compartment 104c, through the third internal valve 116c, and then through the third control valve 110c. A third control valve sensor 112c may be positioned proximal to the third control valve 110c. The third control valve sensor 112c may output a signal indicative of a position or configuration of the third control valve 110c, such as a signal indicative of the third control valve 110c being in the open configuration or the closed configuration. The third control valve 110c may be opened and closed manually by an operator or automatically (e.g., when the third control valve 110c is actuated by an electronic, pneumatic, magnetic, or electro-mechanical actuator).

The fourth control valve 110d may be fluidly coupled to the fourth internal valve 116d, which may be fluidly coupled to the fourth tank compartment 104d. The fourth control valve 110d may control the release of fluid from the fourth tank compartment 104d, such that fluid may be released from the fourth tank compartment 104d when the fourth control valve 110d and the fourth internal valve 116d are in an open configuration and fluid may not be released from the fourth tank compartment 104d when the fourth control valve 110d is in a closed configuration. When the fourth internal valve 116d and the fourth control valve 110d are both in the open configuration, then the liquid product in the fourth tank compartment 104d may flow out of the fourth tank compartment 104d, through the fourth internal valve 116d, and then through the fourth control valve 110d. A fourth control valve sensor 112d may be positioned proximal to the fourth control valve 110d. The fourth control valve sensor 112d may output a signal indicative of a position or configuration of the fourth control valve 110d, such as a signal indicative of the fourth control valve 110d being in the open configuration or the closed configuration. The fourth control valve 110d may be opened and closed manually by an operator or automatically (e.g., when the fourth control valve 110d is actuated by an electronic, pneumatic, magnetic, or electro-mechanical actuator).

The fifth control valve 110e may be fluidly coupled to the fifth internal valve 116e, which may be fluidly coupled to the fifth tank compartment 104e. The fifth control valve 110e may control the release of fluid from the fifth tank compartment 104e, such that fluid may be released from the fifth tank compartment 104e when the fifth control valve 110e and the fifth internal valve 116e are in an open configuration and fluid may not be released from the fifth tank compartment 104e when the fifth control valve 110e is in a closed configuration. When the fifth internal valve 116e and the fifth control valve 110e are both in the open configuration, then the liquid product in the fifth tank compartment 104e may flow out of the fifth tank compartment 104e, through the fifth internal valve 116e, and then through the fifth control valve 110e. A fifth control valve sensor 112e may be positioned proximal to the fifth control valve 110e. The fifth control valve sensor 112e may output a signal indicative of a position or configuration of the fifth control valve 110e, such as a signal indicative of the fifth control valve 110e being in the open configuration or the closed configuration. The fifth control valve 110e may be opened and closed manually by an operator or automatically (e.g., when the fifth control valve 110e is actuated by an electronic, pneumatic, magnetic, or electro-mechanical actuator).

The sixth control valve 110f may be fluidly coupled to the sixth internal valve 116f, which may be fluidly coupled to the sixth tank compartment 104f. The sixth control valve 110f may control the release of fluid from the sixth tank compartment 104f, such that fluid may be released from the sixth tank compartment 104f when the sixth control valve 110f and the sixth internal valve 116f are in an open configuration and fluid may not be released from the sixth tank compartment 104f when the sixth control valve 110f is in a closed configuration. When the sixth internal valve 116f and the sixth control valve 110f are both in the open configuration, then the liquid product in the sixth tank compartment 104f may flow out of the sixth tank compartment 104f, through the sixth internal valve 116f, and then through the sixth control valve 110f. A sixth control valve sensor 112f may be positioned proximal to the sixth control valve 110f. The sixth control valve sensor 112f may output a signal indicative of a position or configuration of the sixth control valve 110f, such as a signal indicative of the sixth control valve 110f being in the open configuration or the closed configuration. The sixth control valve 110f may be opened and closed manually by an operator or automatically (e.g., when the sixth control valve 110f is actuated by an electronic, pneumatic, magnetic, or electro-mechanical actuator).

In some embodiments, one or more of the plurality of control valves 110a, ..., 110f may be a control valve as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of control valves 110a, ..., 110f may be an API Adaptor, model number 891BA-LK by Civacon, though embodiments are not limited thereto.

Each of the control valves 110a, ..., 110b may include a control valve lever that is coupled to the control valve 110 and used by the operator to manually (e.g. physically) transition the control valve 110 from a normally closed configuration to an open configuration. A lock, such as a pneumatic or electronic lock mechanism, may be coupled to the body of the control valve 110. The lock, when enabled by the electronic control unit 130, may allow the control valve 110 to be transition from the normally locked state to the unlocked state. thereby enabling the operator to open the control valve 110 using the control valve lever. The lock may be coupled to the control valve lever internal to the body of the control valve 110 and may mechanically restrict (i.e. stop) the movement of the control valve 110 when in the normally locked state.

Referring again to FIG. 1, the plurality of hose tag readers 114a, ..., 114f may include a first hose tag reader 114a, a second hose tag reader 114b, a third hose tag reader 114c, a fourth hose tag reader 114d, a fifth hose tag reader 114e, and a sixth hose tag reader 114f. The first hose tag reader 114a may be associated with the first tank compartment 104a. In some embodiments, the first hose tag reader 114a may be an RFID tag reader operable to read an RFID tag on an input-end of a delivery hose when the delivery hose is mechanically connected to a connection point on the product delivery vehicle 102 that is in fluid communication with the first tank compartment 104a. The second hose tag reader 114b may be associated with the second tank compartment 104b. In some embodiments, the second hose tag reader 114b may be an RFID tag reader operable to read an RFID tag on the input-end of a delivery hose when the delivery hose is mechanically connected to a connection point on the product delivery vehicle 102 that is in fluid communication with the second tank compartment 104b. The third hose tag reader 114c may be associated with the third tank compartment 104c. In some embodiments, the third hose tag reader 114c may be an RFID tag reader operable to read an RFID tag on the input-end of a delivery hose when the delivery hose is mechanically connected to a connection point on the product delivery vehicle 102 that is in fluid communication with the third tank compartment 104c. The fourth hose tag reader 114d may be associated with the fourth tank compartment 104d. In some embodiments, the fourth hose tag reader 114d may be an RFID tag reader operable to read an RFID tag on the input-end of a delivery hose when the delivery hose is mechanically connected to a connection point on the product delivery vehicle 102 that is in fluid communication with the fourth tank compartment 104d. The fifth hose tag reader 114e may be associated with the fifth tank compartment 104e. In some embodiments, the fifth hose tag reader 114e may be an RFID tag reader operable to read an RFID tag on the input-end of a delivery hose when the delivery hose is mechanically connected to a connection point on the product delivery vehicle 102 that is in fluid communication with the fifth tank compartment 104e. The sixth hose tag reader 114f may be associated with the sixth tank compartment 104f. In some embodiments, the sixth hose tag reader 114f may be an RFID tag reader operable to read an RFID tag on the input-end of a delivery hose when the delivery hose is mechanically connected to a connection point on the product delivery vehicle 102 that is in fluid communication with the sixth tank compartment 104f.

In some embodiments, one or more of the plurality of hose tag readers 114a, ..., 114f may be a hose tag reader as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference, though embodiments are not limited thereto.

Still referring to FIG. 1, the first delivery hose 190a may include a first input-end hose tag 192a at an input end of the first delivery hose 190a and a first output-end hose tag 194a at an output end of the first delivery hose 190a. In some embodiments, the input end of the first delivery hose 190a may be configured to be mechanically connected to an interface of the product delivery vehicle 102 that is in fluid communication with one of the plurality of tank compartments 104a, ..., 104f from which fluid is to be delivered to a distribution tank. The first input-end hose tag 192a may be read by a hose tag reader (e.g., any of the plurality of hose tag readers 114a, ..., 114f) coupled to the product delivery vehicle 102 proximate to the mechanical connection of the first delivery hose 190a to the product delivery vehicle 102. The output end of the first delivery hose 190a may be configured to be mechanically connected to one of the tank delivery connectors 150a, 150b, which in turn may be mechanically connected to an inlet 172a, 172b of one of the distribution tanks 170a, 170b. The first output-end hose tag 194a may be read by a hose tag reader coupled to the tank delivery connector 150a, 150b proximate to the mechanical connection of the first delivery hose 190a to the tank delivery connector 150a, 150b. The first delivery hose 190a may be mechanically coupled to the product delivery vehicle 102 and fluidly coupled to one of the distribution tanks 170a, 170b in any manner, including any manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the second delivery hose 190b may include a second input-end hose tag 192b at an input end of the second delivery hose 190b and a second output-end hose tag 194b at an output end of the second delivery hose 190b. In some embodiments, the input end of the second delivery hose 190b may be configured to be mechanically connectable to an interface of the product delivery vehicle 102 that is in fluid communication with one of the plurality of tank compartments 104a, . . . , 104f from which fluid is to be delivered to a distribution tank. The second input-end hose tag 192b may be read by a hose tag reader (e.g., any of the plurality of hose tag readers 114a, . . . , 114f) coupled to the product delivery vehicle 102 proximate to the mechanical connection of the second delivery hose 190b to the product delivery vehicle 102. The output end of the second delivery hose 190b may be configured to be mechanically connectable to one of the tank delivery connectors 150a, 150b, which in turn may be mechanically connectable to an inlet 172a, 172b of one of the distribution tanks 170a, 170b. The second output-end hose tag 194b may be read by a hose tag reader. In some embodiments, the hose tag reader may be coupled to the tank delivery connector 150a, 150b proximate to the mechanical connection of the second delivery hose 190b to the tank delivery connector 150a, 150b. Alternatively, in other embodiments, the hose tag reader may be independent of the tank delivery connector 150a, 150b. The second delivery hose 190b may be mechanically coupled to the product delivery vehicle 102 and fluidly coupled to one of the distribution tanks 170a, 170b in any manner, including any manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the first distribution tank 170a may include a first inlet 172a and a first tank tag 174a. In some embodiments, the first tank tag 174a may be an RFID tag that includes an identifier of a liquid stored in the first distribution tank 170a. In some embodiments, the first tank tag 174a may be mechanically coupled to the first inlet 172a. In some embodiments, the first tank tag 174a may be positioned proximate to the first inlet 172a of the first distribution tank 170a. In some embodiments, the first tank tag 174a may be positioned proximate to the first inlet 172a of the first distribution tank 170a such that when one of the tank delivery connectors 150a, 150b is mechanically coupled to the first inlet 172a, a corresponding tag reader of the tank delivery connector 150a, 150b can read the first tank tag 174a. The second distribution tank 170b may include a second inlet 172b and a second tank tag 174b. In some embodiments, the second tank tag 174b may be an RFID tag that includes an identifier of a liquid stored in the second distribution tank 170b. In some embodiments, the second tank tag 174b may be mechanically coupled to the second inlet 172b. In some embodiments, the second tank tag 174b may be positioned proximate to the second inlet 172b such that when one of the tank delivery connectors 150a, 150b is mechanically coupled to the second inlet 172b, a corresponding tag reader of the tank delivery connector 150a, 150b can read the second tank tag 174b.

Still referring to FIG. 1, the first tank delivery connector 150a may include a first locking lever 151a and a first hose tag reader 153a. In some embodiments, the first tank delivery connector 150a may also include a first tank tag reader 152a. Alternatively, in other embodiments, the first tank tag reader 152a may be independent of the first tank delivery connector 150a. The first locking lever 151a may be configured to mechanically secure the first tank delivery connector 150a to an inlet 172a, 172b of one of the distribution tanks 170a, 170b when the first locking lever 151a is in a locked configuration, such that fluid may flow through the first tank delivery connector 150a and into the distribution tank 170a, 170b. The first tank tag reader 152a may be configured to read a tank tag 174a, 174b in the vicinity of the inlet 172a, 172b of the distribution tank 170a, 170b to which the first tank delivery connector 150a is coupled. For example, in some embodiments, the first delivery connector 150a may be coupled to the first inlet 172a of the first distribution tank 170a, and the first tank tag reader 152a may read the first tank tag 174a positioned proximate to the first inlet 172a of the first distribution tank 170a. In some embodiments, the first tank tag reader 152a may be an RFID tag reader, such as in embodiments in which the first tank tag 174a or the second tank tag 174b is an RFID tag. The first hose tag reader 153a may be an RFID tag reader operable to read an RFID tag on an output-end of one of the delivery hoses 190a, 190b when the delivery hose 190a, 190b is mechanically connected to the first tank delivery connector 150a.

In some embodiments, the first tank delivery connector 150a may include one or more components of the tank delivery connectors described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, the first tank delivery connector 150a may include the same mechanical interface components and may be configured to be mechanically coupled to the first delivery hose 190a or the second delivery hose 190b and/or configured to be mechanically coupled to the first distribution tank 170a or the second distribution tank 170b in the manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the second tank delivery connector 150b may include a second locking lever 151b and a second hose tag reader 153b. In some embodiments, the second tank delivery connector 150b may also include a second tank tag reader 152b. Alternatively, in other embodiments, the second tank tag reader 152b may be independent of the second tank delivery connector 150b. The second locking lever 151b may configured to mechanically secure the second tank delivery connector 150b to the inlet 172a, 172b of one of the distribution tanks 170a, 170b when the second locking lever 151b is in a locked configuration, such that fluid may flow through the second tank delivery connector 150b and into the distribution tank 170a, 170b. The second tank tag reader 152b may be configured to read a tank tag 174a, 174b positioned proximate to the inlet 172a, 172b of the distribution tank 170a, 170b to which the second tank delivery connector 150b is coupled. In some embodiments, the second tank tag reader 152b may be an RFID tag reader, such as in embodiments in which the tank tag 174a, 174b is an RFID tag. The second hose tag reader 153b may be an RFID tag reader operable to read an RFID tag on an output-end of one of the delivery hoses 190a, 190b when the delivery hose 190a, 190b is mechanically connected to the second tank delivery connector 150b. In some embodiments, the second tank delivery connector 150b may include one or more components of the tank delivery connectors described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, the second tank delivery connector 150b may include the same mechanical interface components and is configured to be mechanically coupled to the first delivery hose 190a or the second delivery hose 190b and/or is configured to be mechanically coupled to the first distribution tank 170a or the second distribution tank 170b in the manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Figure 3:
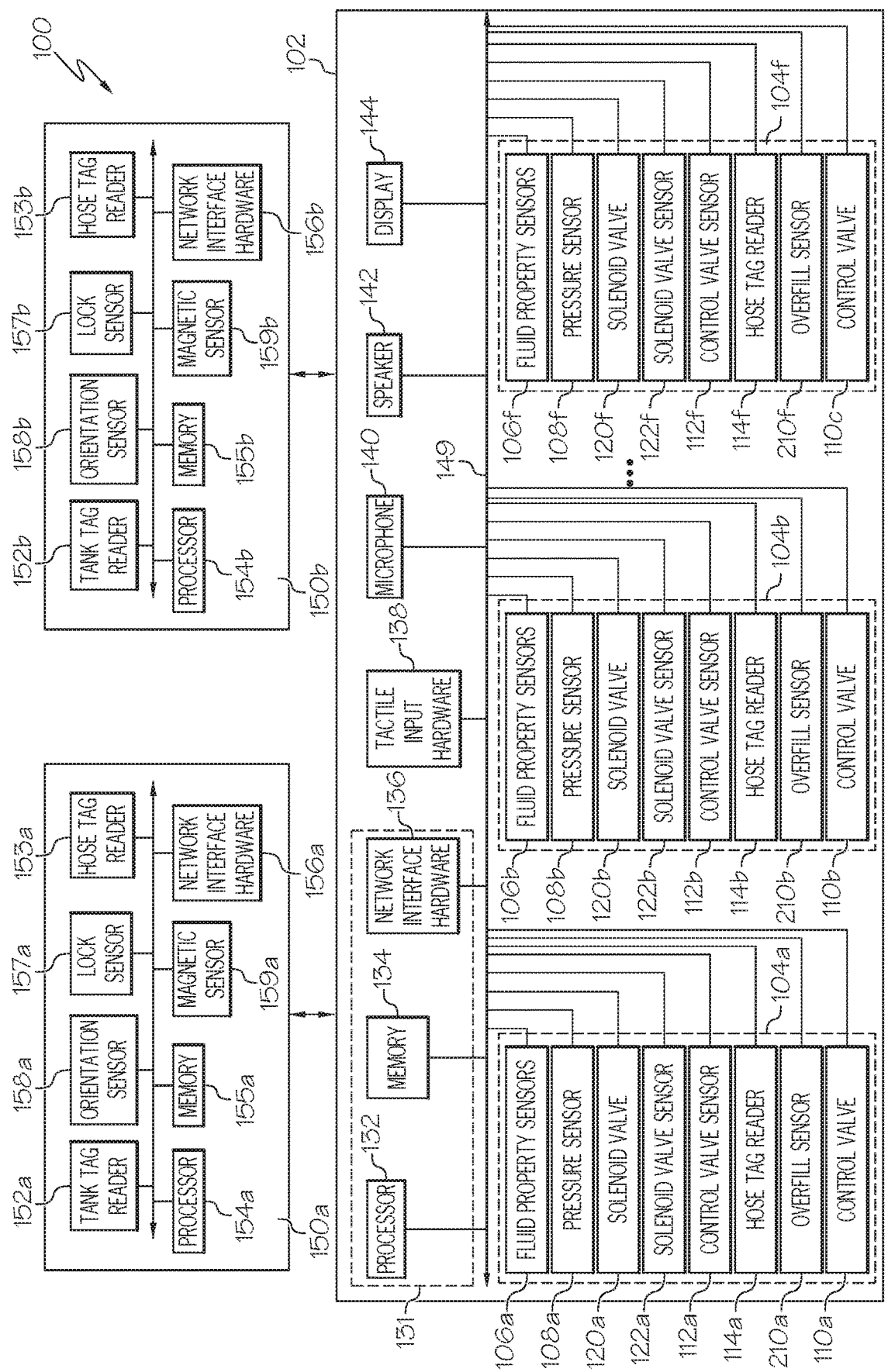
FIG. 3 schematically depicts various electronic components of a product delivery vehicle system, a first tank delivery connector, and a second tank delivery connector, according to one or more embodiments of the present disclosure.

Referring now to FIG. 3, a product delivery vehicle system 100 communicatively coupled to a tag reader unit 250 is schematically depicted. The product delivery vehicle system 100 includes an electronic control unit 130, which includes at least a processor 132 and a memory module 134 communicatively coupled to the processor 132. The electronic control unit 130 may also include a network interface hardware 136 communicatively coupled to the processor 132. The product delivery vehicle system 100 may further include a user input device 138, a microphone 140, a speaker 142, a display 144, and a communication path 149. The plurality of fluid property sensors 106a, . . . , 106f, the plurality of pressure sensors 108a, . . . , 108f, the plurality of control valves 110a, . . . , 110f, plurality of control valve locks, plurality of control valve sensors 112a, . . . , 112f, the plurality of hose tag readers 114a, . . . , 114f, the main air valve 204, the plurality of solenoid valves 120a, . . . , 120f, the plurality of solenoid valve sensors 122a, . . . , 122f, and the plurality of overfill sensors 210a, . . . , 210f may be communicatively coupled to the electronic control unit 130 through the communication path 149.

Still referring to FIG. 3, the communication path 149 may be formed from any medium that is capable of transmitting a signal such as, for example, conductive wires, conductive traces, optical waveguides, or the like. Moreover, the communication path 149 may be formed from a combination of mediums capable of transmitting signals. In one embodiment, the communication path 149 comprises a combination of conductive traces, conductive wires, connectors, and buses that cooperate to permit the transmission of electrical data signals to components such as processors, memories, sensors, input devices, output devices, and communication devices. Accordingly, the communication path 149 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 149 may communicatively couple the various components of the product delivery vehicle system 100, including the electronic control unit 130 (which includes the processor 132, the memory module 134, and the network interface hardware 136), the user input device 138, the microphone 140, the speaker 142, the display 144, the plurality of fluid property sensors 106a, . . . , 106f, the plurality of pressure sensors 108a, . . . , 108f, the plurality of control valves 110a, . . . , 110f, the plurality of control valve locks, the plurality of control valve sensors 112a, . . . , 112f, the plurality of hose tag readers 114a, . . . , 114f, the main air valve 204, the plurality of solenoid valves 120a, . . . , 120f, the plurality of solenoid valve sensors 122a, . . . , 122f, and the plurality of overfill sensors 210a, . . . , 210f. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 3, the processor 132 may be any device capable of executing machine readable instructions. Accordingly, the processor 132 may be a controller, an integrated circuit, a microchip, a computer, or any other computing device. The processor 132 may be communicatively coupled to the other components of the product delivery vehicle system 100 by the communication path 149. While FIG. 3 shows one processor 132, in other embodiments, multiple processors may be communicatively coupled by the communication path 149. Communicatively coupling the multiple processors by the communication path 149 may allow multiple processors to operate in a distributed computing environment.

Still referring to FIG. 3, the memory module 134 may be coupled to the communication path 149 and communicatively coupled to the processor 132. The memory module 134 may comprise RAM, ROM, flash memories, hard drives, or any device capable of storing machine readable instructions such that the machine readable instructions can be accessed and executed by the processor 132. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the memory module 134. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, the display 144 may be coupled to the communication path 149 and communicatively coupled to the processor 132. The display 144 may be any device capable of providing visual output such as, for example, a schematic representation of the product delivery vehicle 102 and information pertaining to unloading fluid therefrom, as will be described below. The display 144 may also display information pertaining to loading of fluids to the tank compartments of the product delivery vehicle 102. The display 144 may include any medium capable of transmitting an optical output such as, for example, a cathode ray tube, light emitting diodes, a liquid crystal display, a plasma display, or the like. Moreover, the display 144 may be a touchscreen that, in addition to providing optical information, detects the presence and location of a tactile input upon a surface of or adjacent to the display. Accordingly, each display may receive mechanical input directly upon the optical output provided by the display. Thus, a touchscreen may include both the display 144 and the user input device 138. Additionally, it is noted that the display 144 can include one or more processors and one or memory modules. In some embodiments, the display 144 may include the processor 132 and the memory module 134. Referring to FIGS. 5-10 in conjunction with FIG. 3, the product delivery vehicle system 100 may include a plurality of graphical user interfaces that may be displayed on the display 144.

Referring again to FIG. 3, the user input device 138 may be coupled to the communication path 149 and communicatively coupled to the processor 132. The user input device 138 may be any device capable of transforming mechanical, optical, electrical signals, or sound waves into a data signal capable of being transmitted with the communication path 149. Specifically, the user input device 138 may include any number of movable objects that each transform physical motion into a data signal that can be transmitted to over the communication path 104 such as, for example, a button, a switch, a knob, a mouse, a joystick, or the like. In some embodiments, the display 144 and the user input device 138 may be combined as a single module and operate as a touchscreen. However, it is noted, that the display 144 and the user input device 138 may be separate from one another and operate as a single module by exchanging signals via the communication path 149.

Still referring to FIG. 3, the speaker 142 may be coupled to the communication path 149 and communicatively coupled to the processor 132. The speaker 142 may transform data signals into mechanical vibrations, such as in order to provide information related to operation of the product delivery vehicle system 100. However, it should be understood that in other embodiments the product delivery vehicle system 100 may not include the speaker 142.

Still referring to FIG. 3, the microphone 140 is coupled to the communication path 149 and communicatively coupled to the processor 132. The microphone 140 may be any device capable of receiving a mechanical vibration at the microphone and transforming the received mechanical vibration into an electrical signal indicative of the received mechanical vibration. The microphone 140 may provide another way for a user to provide input to the product delivery vehicle system 100.

Still referring to FIG. 3, network interface hardware 136 may be coupled to the communication path 149 and communicatively coupled to the processor 132. The network interface hardware may be any device capable of transmitting and/or receiving data via a network. Accordingly, the network interface hardware 136 can include a communication transceiver for sending and/or receiving any wired or wireless communication. For example, the network interface hardware 136 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, network interface hardware 136 includes a wireless communication module configured to send and receive wireless communication with other devices. In some embodiments, network interface hardware 136 communicates wirelessly according to the IrDA, Bluetooth, Wireless USB, Z-Wave, ZigBee, and/or any other wireless communication protocols.

Referring still to FIG. 3, the first tank delivery connector 150a may include a first tank tag reader 152a, a first hose tag reader 153a, a first processor 154a, a first memory module 155a, first network interface hardware 156a, a first lock sensor 157a, a first orientation sensor 158a, a first magnetic sensor 159a, and a first communication path 160a.

Still referring to FIG. 3, the first communication path 160a may be formed from any medium that is capable of transmitting a signal such as, for example, conductive wires, conductive traces, optical waveguides, or the like. Moreover, the first communication path 160a may be formed from a combination of mediums capable of transmitting signals. In some embodiments, the first communication path 160a may comprise a combination of conductive traces, conductive wires, connectors, and buses that cooperate to permit the transmission of electrical data signals to components such as processors, memories, sensors, input devices, output devices, and communication devices. The first communication path 160a may have any other feature or functionality of the communication path 149 previously described herein in relation to the electronic control unit 130. The first communication path 160a may communicatively couple the various components of the first tank delivery connector 150a, including the first tank tag reader 152a, the first hose tag reader 153a, the first processor 154a, the first memory module 155a, first network interface hardware 156a, the first lock sensor 157a, the first orientation sensor 158a, and the first magnetic sensor 159a.

Still referring to FIG. 3, the first processor 154a may be any device capable of executing machine readable instructions. Accordingly, the first processor 154a may be a controller, an integrated circuit, a microchip, a computer, or any other computing device. The first processor 154a may have any other feature or functionality of a processor previously described herein in relation to processor 132 of the electronic control unit 130. The first processor 154a may be communicatively coupled to the other components of the first tank delivery connector 150a by the first communication path 160a. While FIG. 3 shows one first processor 154a, in other embodiments, multiple processors may be communicatively coupled by the first communication path 160a, which may allow the multiple processors to operate in a distributed computing environment.

Still referring to FIG. 3, the first memory module 155a may be coupled to the first communication path 160a and communicatively coupled to the first processor 154a. The first memory module 155a may comprise RAM, ROM, flash memories, hard drives, or any device capable of storing machine readable instructions such that the machine readable instructions can be accessed and executed by the first processor 154a. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the first memory module 155a. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The first memory module 155a may have any other features or functionality of a memory module previously described herein in relation to the memory modules 134 of the electronic control unit 130.

Still referring to FIG. 3, first network interface hardware 156*a* may be coupled to the first communication path 160*a* and communicatively coupled to the first processor 154*a*. The network interface hardware may be any device capable of transmitting and/or receiving data via a network. Accordingly, the first network interface hardware 156*a* can include a communication transceiver for sending and/or receiving any wired or wireless communication. For example, the first network interface hardware 156*a* may include an antenna, a modem, LAN port, Wi-Fi card, WiMax card, mobile communications hardware, near-field communication hardware, satellite communication hardware and/or any wired or wireless hardware for communicating with other networks and/or devices, such as the product delivery vehicle system 100. In some embodiments, first network interface hardware 156*a* includes a wireless communication module configured to send and receive wireless communication with other devices, such as the product delivery vehicle system 100. In some embodiments, first network interface hardware 156*a* communicates wirelessly according to the IrDA, Bluetooth, Wireless USB, Z-Wave, ZigBee, and/or any other wireless communication protocols. The first network interface hardware 156*a* may have any other features or functionality of a memory module previously described herein in relation to the network interface hardware 136 of the electronic control unit 130.

Still referring to FIG. 3, the first tank tag reader 152*a* and the first hose tag reader 153*a* may be coupled to the first communication path 160*a* and communicatively coupled to the first processor 154*a*. The first tank tag reader 152*a* may be a tank tag reader configured to read a tank tag of a distribution tank when the first tank tag reader 152*a* is positioned sufficiently near the tank tag. Similarly, the first hose tag reader 153*a* may be a hose tag reader configured to read a tag of a delivery hose when the first hose tag reader 153*a* is positioned sufficiently near the hose tag. In some embodiments each of the first tank tag reader 152*a* and the first hose tag reader 153*a* may be RFID tag readers configured to read an RFID tag within the range of the reader. Alternatively, in other embodiments, the first tank tag reader 152*a* and/or the first hose tag reader 153*a* may be tag readers other than RFID tag readers, such as in embodiments in which the tank tag and/or the hose tag are tags other than RFID tags.

Still referring to FIG. 3, the first lock sensor 157*a* may be coupled to the first communication path 160*a* and communicatively coupled to the first processor 154*a*. The first lock sensor 157*a* may output a signal indicative of a position or configuration of the first locking lever 151*a* (FIG. 1) of the first tank delivery connector 150*a*, such as a signal indicative of the first locking lever 151*a* being in a locked configuration or in an unlocked configuration.

Still referring to FIG. 3, the first orientation sensor 158*a* may be coupled to the first communication path 160*a* and communicatively coupled to the first processor 154*a*. The first orientation sensor 158*a* may output a signal indicative of an orientation of the first tank delivery connector 150*a* (e.g., whether upright, horizontal, etc.) In some embodiments, the first orientation sensor 158*a* may be an inertial measurement unit, an accelerometer, or a gyroscope.

Still referring to FIG. 3, the first magnetic sensor 159*a* may be coupled to the first communication path 160*a* and communicatively coupled to the first processor 154*a*. The first magnetic sensor 159*a* may output a signal indicative of a strength of a magnetic field in which the first magnetic sensor 159*a* is positioned. In some embodiments, the first magnetic sensor 159*a* may be a hall effect sensor, though embodiments are not limited thereto.

Still referring to FIG. 3, the second tank delivery connector 150*b* may include a second tank tag reader 152*b*, a second hose tag reader 153*b*, a second processor 154*b*, a second memory module 155*b*, a second network interface hardware 156*b*, a second lock sensor 157*b*, a second orientation sensor 158*b*, a second magnetic sensor 159*b*, and a second communication path 160*b*. In some embodiments, the second tank tag reader 152*b*, the second hose tag reader 153*b*, the second processor 154*b*, the second memory module 155*b*, second network interface hardware 156*b*, the second lock sensor 157*b*, the second orientation sensor 158*b*, the second magnetic sensor 159*b*, and the second communication path 160*b* are the same as the first tank tag reader 152*a*, the first hose tag reader 153*a*, the first processor 154*a*, the first memory module 155*a*, first network interface hardware 156*a*, the first lock sensor 157*a*, the first orientation sensor 158*a*, the first magnetic sensor 159*a*, and the first communication path 160*a* of the first tank delivery connector 150*a*, respectively and are interconnected in the same way as the components of the first tank delivery connector 150*a*.

Figure 4:
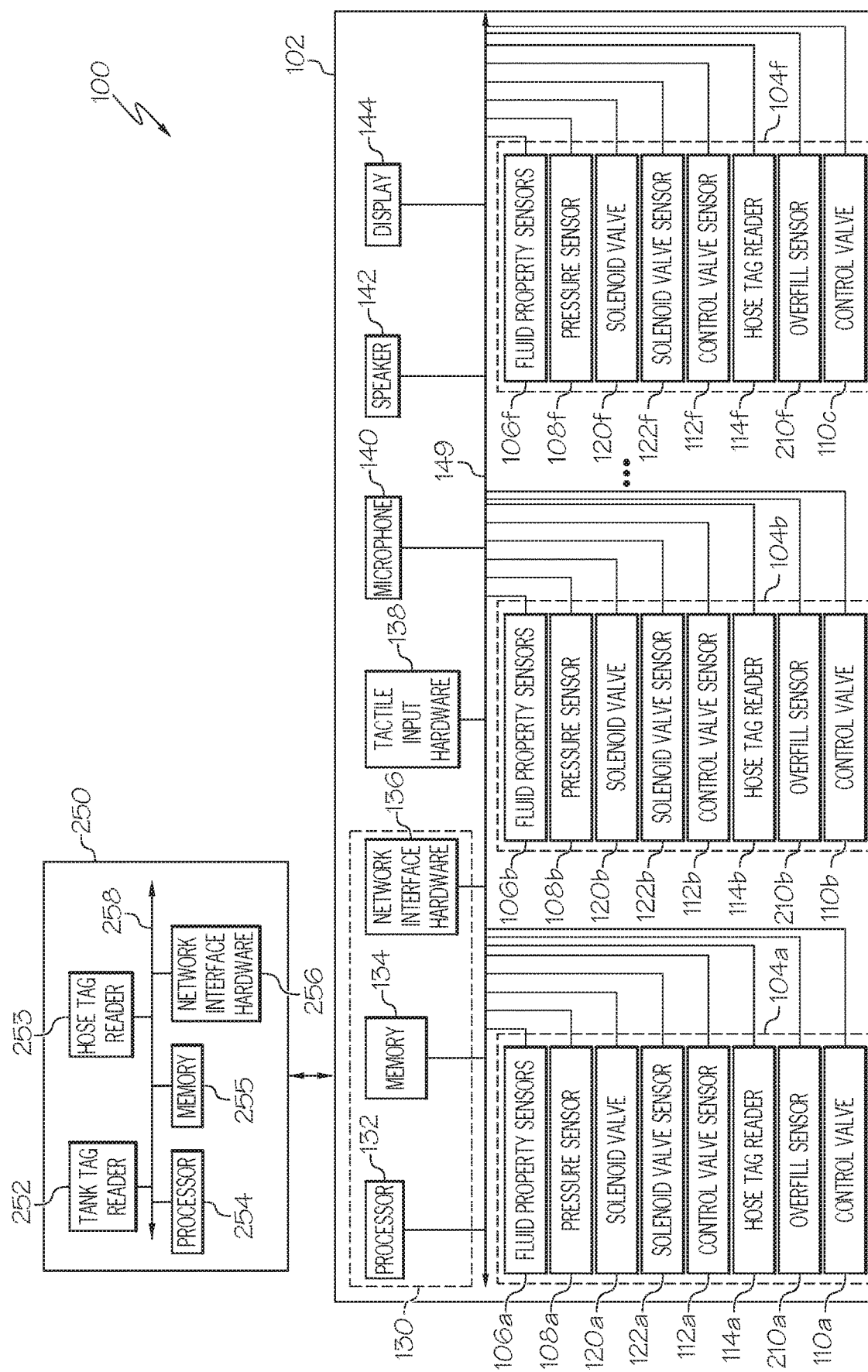
FIG. 4 schematically depicts various electronic components of another embodiment of a product delivery vehicle system and a tag reader unit, according to one or more embodiments of the present disclosure.

Referring to FIG. 4, in some embodiments, the product delivery vehicle system 100 may include a separate tag reader unit 250. The tag reader unit 250 may be used in place of or in addition to the tank delivery connectors 150*a*, 150*b*. In these embodiments, the electronic control unit 130 of the product delivery vehicle system 100 may be in electronic communication with the tag reader unit 250. The tag reader unit 250 may include a tank tag reader 252. The tag reader unit 250 may also include a hose tag reader 253, a tag reader processor 254, and one or more tag reader memory modules 255, a tag reader network interface hardware 256, and a tag reader communication path 258.

The tag reader processor 254, the tag reader memory modules 255, the tag reader network interface hardware 256, and the tag reader communication path 258 of the tag reader unit 250 may include any of the features of the processor 132, memory modules 134, network interface hardware 136, or communication path 149, respectively, which were previously described in relation to electronic control unit 130. The tag reader communication path 258 may communicatively couple the various components of the tag reader unit 250, including the tank tag reader 252, the hose tag reader 253, the tag reader processor 254, the tag reader memory module 255, and the tag reader network interface hardware 256.

Referring still to FIG. 4, the tank tag reader 252 and the hose tag reader 253 may be coupled to the tag reader communication path 258 and communicatively coupled to the tag reader processor 254. The tank tag reader 252 may be a tag reader configured to read a tank tag of a distribution tank when the tank tag reader 252 is positioned sufficiently near the tank tag. Similarly, the hose tag reader 253 of the tag reader unit 250 may be a tag reader configured to read a tag of a delivery hose when the hose tag reader 253 is positioned sufficiently near the hose tag. In some embodiments each of the tank tag reader 252 and the hose tag reader 253 may be RFID tag readers configured to read an RFID tag within the range of the tag reader. In some embodiments, the tank tag reader 252 and/or the hose tag reader 253 may be tag readers other than RFID tag readers, such as in embodiments in which the tank tag and/or the hose tag are tags other than RFID tags.

Although shown in FIG. 4 as having one tag reader unit 250 in electronic communication with the electronic control unit 130, in some embodiments, the product delivery vehicle system 100 may have a plurality of tag reader units 250, such as 2, 3, 4, 5 or more than 5 tank reader units 250.

Referring to FIGS. 1-3, as previously described, the product delivery vehicle system 100 may be operable to prevent comingling of dissimilar liquid products when loading or unloading the product delivery vehicle 102. The product delivery vehicle system 100 may also be operable to prevent overfill of the tank compartments 104a, . . . , 104f during loading of the product delivery vehicle 102 at a loading station. The product delivery vehicle system 100 may also be operable to control the air system 200 on the product delivery vehicle 102. The electronic control unit 130 of the product delivery vehicle system 100 may control the flow of liquid product to and from each tank compartment 104a, . . . , 104f through control of the air system 200 to open and close the internal valves 116a, . . . , 116f associated with the tank compartments 104a, . . . , 104f and/or locking or unlocking the control valve 110a, . . . , 110f associated with the tank compartments 104a, . . . , 104f. If the potential for co-mingling of dissimilar liquid products in one of the tank compartments 104a, . . . , 104f and one of the distribution tanks 170a, 170b is present, the product delivery vehicle system 100 may prevent the internal valve 116a, . . . , 116f, the control valve 110a, . . . , 110f, or both corresponding to the tank compartment 104a, . . . , 104f from being opened thus preventing the co-mingling and cross-contamination of the dissimilar liquid products.

Figure 5:
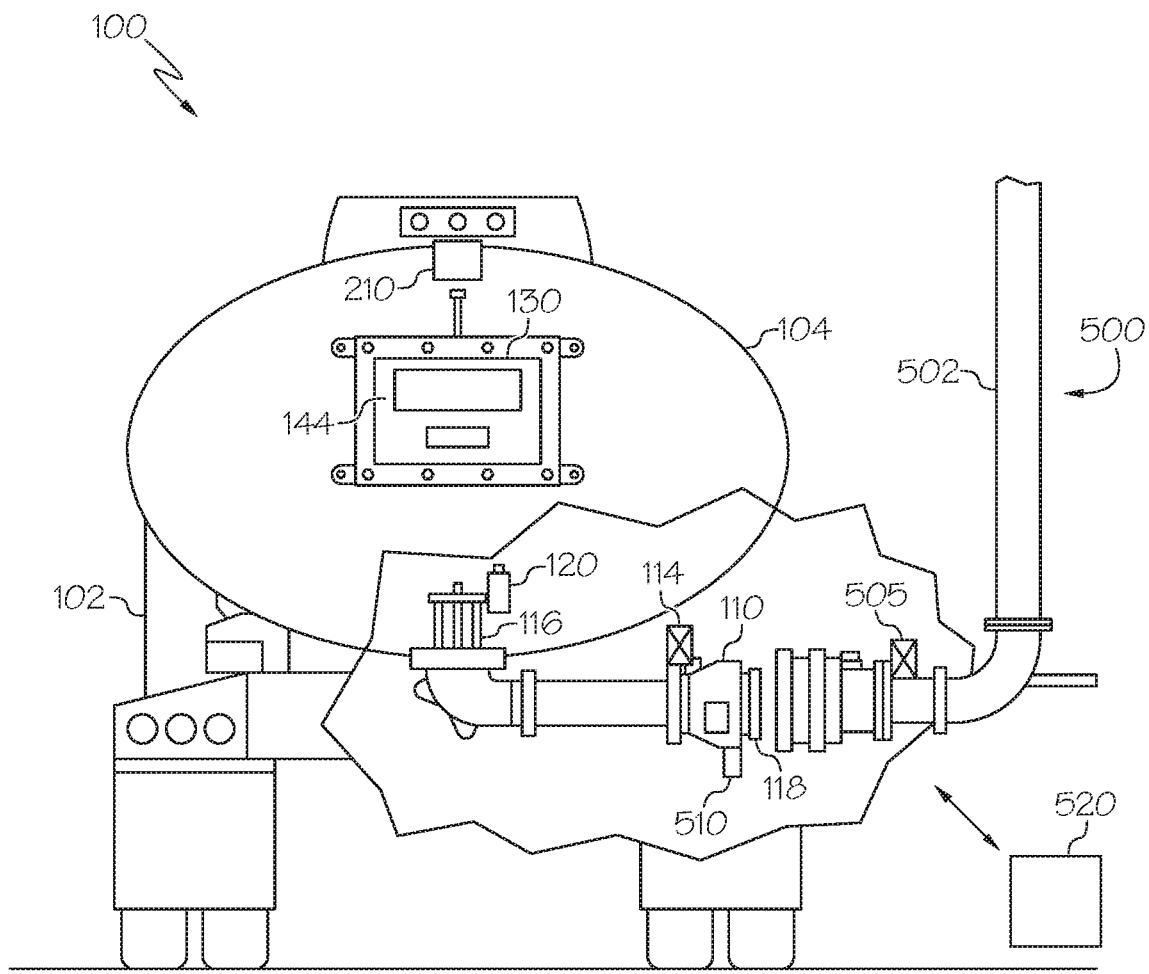
FIG. 5 schematically depicts the product delivery vehicle of FIG. 1 at a loading station, according to one or more embodiments of the present disclosure.

Operation of the product delivery vehicle system 100 to prevent comingling of liquid products and overfill of tank compartments during loading operations will now be described. Referring to FIG. 5, a product delivery vehicle 102 is schematically depicted at a loading station. In some embodiments, the product delivery vehicle 102 may arrive at the loading station completely empty. In the "empty" state, the electronic control unit 130 may have the loaded liquid type in a particular tank compartment 104 set either by the operator using a user input hardware 138, by the fluid property sensor (FPS) 106 determining the transported liquid type, by the FPS 106 indicating a "dry" sensor condition, or the pressure sensor 108 indicating the amount of liquid product is zero or near zero. In the later cases, the loaded liquid type may be set to "empty" when there is no liquid product in a particular tank compartment 104. In some other embodiments, the product delivery vehicle 102 may arrive at the loading station with at least one of the plurality of tank compartments 104 empty, as for example if the product delivery vehicle 102 just returned from a product delivery run.

The electronic control unit 130 may store the last status from the product delivery run for each tank compartment 104 in the memory module 134. For example, if one of the tank compartments 104 is empty, the electronic control unit 130 may set the last status to "empty" automatically based on readings from either the pressure sensor 108 or FPS 106 and without input from the operator. The electronic control unit 130 may display the last status on the display 144. Otherwise, the electronic control unit 130 may display on the display 144 an error code, which may include a message that may alternate between one or more of "Prior Product Grade," "Retained Product," and "Frustrated Load" to indicate that the tank compartment 104 is not empty from the product delivery run. The "Prior Product Grade" message indicates what liquid product was in the tank compartment 104. The "Retained Product" message indicates that there is liquid product left in the tank compartment 104, and the "Frustrated Load" message indicates that not all of the product was delivered to the distribution tank 170a, 170b. To alert the operator to make a selection before filling the tank compartments 104, the electronic control unit 130 may provide an alarm, such as a visual alarm displayed on the display 144 or an audio alarm transmitted by the speaker 142, for example.

Referring again to FIG. 5, to load liquid product into a tank compartment 104, one of the tank compartments 104 may be fluidly coupled to a loading system 500. The loading system 500 may include a storage tank (not shown), a loading pump (not shown) fluidly coupled to the storage tank, a loading arm 502 fluidly coupled to an outlet of the loading pump, and a loading controller 520. The loading system 500 may additionally include other valves, gauges, flow meters, or other devices typical of loading systems. The loading arm 502 may include a loading arm tag 505 having representative information for the liquid product associated with the storage tank from which the tank compartment 104 is to be loaded.

Before loading a tank compartment, an operator may couple the loading arm 502 to a hose adaptor 133 coupled to the outlet end of the control valve 110, the outlet end of the control valve 110 being the end not fluidly coupled to the internal valve 116. In some embodiments, the operator may also electrically couple the loading system 500 to the electronic control unit 130. The electrical coupling of the loading system 500 to the electronic control unit 130 may be accomplished by a socket connection (not shown). In some embodiments, the loading system 500 may also include a vapor recovery system (not shown) comprising at least one vapor adaptor connection (not shown) for collecting volatile vapors from the loading operation and conveying the volatile vapors to a recovery or treatment system. In some embodiments, the operator may connect the vapor adaptor connection to the tank compartment 104. The operator may also turn on the air system 200 by opening the main air valve 204 of the air system 200. In some embodiments, the electronic control unit 130 may be operable to receive a user input indicative of a command to open the main air valve 204 from the user input hardware 138 and transmit an open signal to the actuator 205 of the main air valve 204 to transition the main air valve 204 from a normally closed position to an open position.

In some embodiments, the electronic control system 130 may not allow the operator to load the liquid product into one or more of the tank compartments 104 until the loaded liquid type is set for the tank compartment. For example, when an operator attempts to load a tank compartment 104, such as by attempting to open the internal valve 116 and/or the control valve 110 associated with the tank compartment 104, the electronic control unit 130 may display an error message and instruct the operator that the loaded liquid type is not selected or that a mismatch of liquid types may occur between the liquid product the operator wishes to load and a current transported liquid type already present in the tank compartment 104. The electronic control unit 130 may prevent the corresponding internal valve 116 from opening by preventing the solenoid valve 120 corresponding to the internal valve 116 from being operated by the operator through the electronic control unit 130. Additionally or alternatively, in some embodiments, the electronic control unit 130 may maintain the control valve 110 corresponding to the tank compartment in the normally locked state. The electronic control unit 130 may prevent the internal valve 116 being opened and/or may maintain the control valve 110 in the locked state until the electronic control unit 130 indicates that the loaded liquid type has been entered and/or the loaded liquid type and the transported liquid type are the same. Once the loaded liquid type is accepted by the electronic control unit 130, the electronic control unit 130 may enable the operator to open the corresponding solenoid valve 120 to transition the internal valve 116 to an open position. Additionally or alternatively, in some embodiments, once the loaded liquid type is accepted by the electronic control unit 130, the electronic control unit 130 may transition the control valve 110 from the normally locked state to the unlocked state. Once the internal valve 116 is opened and the control valve 110 is unlocked for the corresponding tank compartment 104, the operator may then manually transition the control valve 110 to open and fill the tank compartment 104 with the liquid product.

In one or more embodiments, as the tank compartment 104 is filled, the FPS 106 may sense the liquid product and transmit a transported liquid property signal for the liquid product being loaded into the tank compartment 104. The transported liquid property signal of the liquid product being loaded into the tank compartment 104 and sensed by the FPS 106 may be indicative of at least one of a density, a viscosity, a dielectric constant, a temperature, or combinations thereof of the liquid product being loaded into the tank compartment 104. The electronic control unit 130 may read or poll the FPS 130 to receive the transported liquid product property signal. Based on the transported liquid property signal received from the FPS 106, the electronic control unit 130 may determine the identity of the liquid product being loaded into the tank compartment 104. In one embodiment, the electronic control unit 130 may determine the identity of the liquid product in the tank compartment 104 by comparing the transported liquid property signal transmitted or read from the FPS 106 to a database or look up table (LUT) of transported liquid property signals stored in a computer readable medium and indexed according to liquid product type.

If, for example, the electronic control unit 130 determines that the transported liquid type determined from the FPS 130 transported liquid property signal does not match the loaded liquid type input into the electronic control unit 130 by the operator using the user input hardware 138, the electronic control unit 130 may prevent the operator from opening the solenoid valve 120 corresponding to the internal valve 116 for the tank compartment 104 or send a control signal to close the solenoid valve 120, thereby transitioning the internal valve 116 from the open state to the normally closed state. Additionally or alternatively, in some embodiments, the electronic control unit 130 may maintain the control valve 110 in the normally locked state or transition the control valve 110 from the unlocked state to the normally locked state, thereby closing the control valve 110 and stopping the flow of liquid product into the tank compartment 104. In some embodiments, the product delivery vehicle system 100 may include an operator override, to enable the operator to override the electronic control unit to manually transition the control valve 110 from the normally locked state to the unlocked state and continue filling the tank compartment 104.

In some embodiments, where the liquid product is a petroleum product, the electronic control unit 130 may determine whether the liquid product in the tank compartment 104 is a distillate or gasoline liquid product. When the liquid product is gasoline, the electronic control unit 130 may alert the operator to enter in the product grade (i.e., the octane rating) of the gasoline that has been loaded into the tank compartment 104 by displaying a message on the display 144. In some embodiments, the operator may select from a variety of pre-programmed options to set the grade (i.e., specific liquid product type) of the liquid product being loaded. The electronic control unit 130 may receive the liquid product type input using the user input hardware 138 and may store, in a computer readable medium, the liquid product type information for the tank compartment 104 holding the liquid product. The process may be repeated as other tank compartments 104 are filled with either the same liquid product or a different liquid product. Alternatively, in other embodiments, the electronic control unit 130, upon receiving the transported liquid property signal from the FPS 106, may determine the product grade and populate the liquid product type or grade. In some embodiments, the electronic control unit 130 may enable the operator to change the product grade using the user input hardware 138.

Still referring to FIG. 4, in one embodiment, the loading arm 502 of the loading system 500 may include a loading arm tag 505 having the loaded liquid type encoded therein. The hose tag reader 114 may interrogate the loading arm tag 205 and transmit a first signal encoding a loaded liquid type to the electronic control unit 130. The loaded liquid type information may be received by the electronic control unit 130 and recorded to the memory module 134. The loaded liquid type information may be correlated to the tank compartment 104 that the liquid product is being loaded into. As the liquid product is being loaded into the tank compartment 104, the FPS 106 may sense the transported liquid property and may communicate a transported liquid property signal to the electronic control unit 130, as described above. The electronic control unit 130 may determine the transported liquid product type based on the transported liquid property signal. The electronic control unit 130 may compare the loaded liquid product type received from the hose tag reader 114 to the transported liquid product type determined by the electronic control unit 130 from the signal received from the FPS 106 to confirm a match between the loaded liquid product type and the transported liquid product type. The electronic control unit 130 may store, in a computer readable medium, the transported liquid type for the tank compartment 104 holding the liquid product based on either the loaded liquid type or the transported liquid type sensed by the FPS 130. The process is repeated as other tank compartments 104 are filled in the product transport vehicle 102 with either the same liquid product or a different liquid product.

If the liquid product information from the hose tag reader 114 does not match the transported liquid type indicated by the FPS 130 or does not match the loaded liquid type from the operator's input, the electronic control unit 130 may prevent the operator from opening the solenoid valve 120 of the air system 200 to transition the internal valve 116 for the tank compartment 104 from the normally closed state to the open state, thereby preventing or stopping the flow of the fluid into the tank compartment 104. In some embodiments, the electronic control unit 130 may disable at least a portion of the user input hardware 138 or at least a portion of a graphical user interface to prevent the operator from operating the solenoid valves 120 of the air system 200. In some embodiments, in the event of a mismatch, the electronic control unit 130 may also disable the transition of the control valve 110 from the normally locked state to the unlocked state to prevent the flow of liquid product into the tank compartment 104. In some embodiments, the electronic control unit 130 may display an error message on the display 144 indicative of the mismatch. In other embodiments, the electronic control unit 130 may also produce an audible signal to indicate a mismatch. In some embodiments, the operator may override the electronic control unit 130 to enable the transition of the internal valve 116 from the normally closed state to the open state and/or transition the control valve 110 from the normally locked state to the unlocked state tocontinue filling the tank compartment 104.

Referring to FIG. 5, in some embodiments, the product delivery vehicle system 100 may further include a loading arm sensor 510 communicatively coupled to the electronic control unit 130. The loading arm sensor 510 may be mounted proximal to the hose adaptor 118 and may provides a loading arm signal to the electronic control unit 130 to determine when the loading arm 502, is fluidly coupled to the hose adaptor 118. If the loading arm sensor 510 indicates that the loading arm 502 is not coupled to the hose adaptor 118, the electronic control unit 130 may display on the display 144 that the loading arm 502 is not coupled to any of the tank compartments 104 of the product transport vehicle 102 and the electronic control unit 130 may maintain the internal valve 116 in the normally closed position and/or maintain the control valve 110 in the normally locked state to prevent a spill.

The product delivery vehicle system 100 may also be operable to prevent overfilling the tank compartment 104 during the unloading process. As previously described, the product delivery vehicle system 100 may include one or a plurality of overfill sensors 210, which may be communicatively coupled to the electronic control unit 130. In some embodiments, the overfill sensors 210 may be part of an overfill detection system (not shown) that may be communicatively coupled to the electronic control unit 130. The overfill sensor 210 may communicate an overfill condition signal to the electronic control unit 130. The overfill condition signal may be indicative of an overfill condition of the tank compartment 104. The electronic control unit 130 may be operable to receive an overfill condition signal from the overfill sensors 210 or the overfill detection system and output a signal to the solenoid valve 120 for the tank compartment 104 to close the solenoid valve 120, thereby transitioning the internal valve 116 from the open state to the normally closed state. Thus, in some embodiments, the electronic control unit 130 of the product delivery vehicle system 100 may be operable to transition the internal valve 116 of a tank compartment 104 in response to receiving an overfill condition signal from the overfill sensor 210 for the tank compartment, the overfill condition signal being indicative of an overfill condition of the tank compartment 104.

In some embodiments, the overfill sensors 210 and/or the onboard overfill detection system on the product transport vehicle 102 may also be communicatively coupled to the loading system 500 at the loading station. In some embodiments, the overfill condition signal may be transmitted by the overfill sensors 210 and/or the onboard overfill detection system to the loading system 500, which may stop the flow of liquid product into the tank compartment 104 in response to the overfill condition signal. Alternatively, in other embodiments, the electronic control system 130 may be communicatively coupleable to the loading system 500 so that the electronic control system 130 may transmit the overfill condition signal to the loading system 500.

In some embodiments, the product delivery vehicle system 100 may include at least one overfill sensor 210 coupled to the tank compartment 102 and communicatively coupled to the electronic control unit 130. The at least one overfill sensor 210 may be operable to determine an overfill condition of the tank compartment 102 and transmit an overfill signal. In some embodiments, the electronic control unit 130 may include machine readable instructions stored on the memory module 134 that, when executed by the processor, may cause the electronic control unit 130 to receive the overfill signal from the at least one overfill sensor 210 during a loading operation, and change an output signal to the solenoid valve 120 to cause the solenoid valve 120 to transition the internal valve 116 from the open configuration to the normally closed configuration.

Referring again to FIGS. 1-3, unloading of a tank compartment 104 of the product delivery vehicle 102 using the product delivery vehicle system 100 disclosed herein will be disclosed. During unloading of the tank compartment 104 to a distribution tank 170, a tank tag reader may be used to identify the liquid product stored in the distribution tank 170. In some embodiments, the tank tag reader may be tank tag reader 152 coupled to a tank delivery connector 150. In other embodiments, the tank tag reader may be tank tag reader 252 (FIG. 4), which may be incorporated into the tag reader unit 250 (FIG. 4). For purposes of illustration, the operation of the system will be described in relation to the delivery connector 150 having the tank tag reader 152, although it is understood that in some embodiments, the a tag reader unit 150 may be used to read the tank tag or any other tag associated with the product delivery vehicle system 100.

The tank tag reader 152 may interrogate a corresponding tank tag 174 located on a distribution tank 170. The tank tag 174 may contain information that relates to the liquid product type stored in the distribution tank 170. The tank tag reader 152 may transmit a stored liquid type signal indicative of the store liquid type to the electronic control unit 130 of the product delivery vehicle system 100. The electronic control unit 130 may automatically compare the transported liquid product type information taken from the FPS 106 to the stored liquid type from the tank tag 174 to determine if a match exists. When a match exists, the electronic control unit 130 may enable opening of the internal valve 116, unlocking of the control valve 110, or both to allow the unloading of the liquid product from the tank compartment 104 to the distribution tank 170. The electronic control unit 130 may also prevent the flow of liquid product if the transported liquid type and the stored liquid type do not match by disabling the internal valve 116, the control valve 110, or both. The electronic control unit 130 may also prevent the flow of liquid product from the tank compartment 104 if other relevant delivery site information stored in the tank tag, such as geo-location data, physical address information, customer account information or the like, does not match. Various embodiments of the product delivery vehicle system 100 and the operation of the product delivery vehicle system 100 will be described in more detail herein with specific reference to the appended drawings.

FIG. 1 schematically depicts the product transport vehicle 102 at a distribution facility unloading liquid product into a first distribution tank 170a and a second distribution tank 170b from a first tank compartment 104a and a second tank compartment 104b, respectively. The operator initially chooses which tank compartment (e.g. the first tank compartment 104a or the second tank compartment 104b) from which the first distribution tank 170a and the second distribution tank 170b will be filled. If the first tank compartment 104a is chosen to fill the first distribution tank 170a, the operator may fluidly couple a first delivery hose 190a to a first hose adaptor corresponding to the first tank compartment 104a. The operator may then fluidly couple a first tank delivery connector 150a to the first delivery hose 190a and fluidly couple the first tank delivery connector 150a to the first distribution tank 170a. The operator may repeat similar steps to fill the second distribution tank 170b from the second tank compartment 104b with either the same liquid product type or a different liquid product type using a second delivery hose 190b and the second delivery connector 150b.

The electronic control unit 130 may be communicatively coupled to a hose tag reader 114 proximal to the control valve 110 and the hose tag reader 153 proximal to the delivery connector 150 (or tag reader unit 250 (FIG. 4)). The hose tag reader 114 may be positioned proximal to the control valve 110 where the delivery hose 190 is coupled to the outlet of the control valve 110. The other hose tag reader 153 may be positioned on the tank delivery connector 150 in a location adjacent to the coupling point of the other end of the delivery hose 190 to the delivery connector 150. The delivery hose 190 may have an input end hose tag 192 positioned proximal the end of the delivery hose to be coupled to the tank compartment 104 and an output end hose tag 194 positioned proximal to an end of the delivery hose to be coupled to the tank delivery connector 150. Both the inlet end hose tag 192 and the outlet end hose tag 194 may have the same hose ID information encoded on them, e.g. a first hose ID, a second hose ID, etc.

When the delivery hose 190 is coupled to the hose adaptor 118, the hose tag reader 114 may interrogate the inlet end hose tag 192 and may transmit the identification information (e.g. the first hose ID) to the electronic control unit 130. When the delivery hose 190 is coupled to the tank delivery connector 150, the hose tag reader 153 may interrogate the outlet end hose tag 194 and may transmit the identification information (e.g. the first hose ID) to the electronic control unit 130.

In some embodiments, the electronic control unit 130 may verify that a delivery hose 190 is coupled to each of the tank delivery connector 150 and the hose adaptor 118 and/or control valve 110. For example, when the delivery hose 190 is properly coupled to the tank delivery connector 150, the hose tag reader 153 may be positioned to read the outlet end hose tag 194 and transmit a hose signal indicative of the hose ID to the electronic control unit 130. In this embodiment, receipt of the hose signal indicative of the hose ID by the electronic control unit 130 may be sufficient to confirm that the delivery hose 190 is properly coupled to the tank delivery connector 150. Similarly, when the delivery hose 190 is properly coupled to the hose adaptor 118 or the control valve 110, the hose tag reader 114 proximate to the control valve 110 may be positioned to read the inlet end hose tag 192 and transmit a hose signal indicative of the hose ID to the electronic control unit 130. In this embodiment, receipt of the hose signal indicative of the hose ID by the electronic control unit 130 may be sufficient to confirm that the delivery hose 190 is properly coupled to the hose adaptor 118 or the control valve 110. When the electronic control unit 130 confirms that the delivery hose 190 is properly coupled to both the tank delivery connector 150 and the hose adaptor 118 or control valve 110, the electronic control unit 130 may allow the corresponding control valve 110 to transition from the normally locked state to the unlocked state, subject to a determination that the transported liquid product type in the corresponding compartment matches the stored liquid product type of the distribution tank 170. In some embodiments, the electronic control unit 130 may confirm that a specific tank compartment 104 is fluidly coupled to a specific distribution tank 170 by matching the identification information of the input end hose tag 192 and the outlet end hose tag 194 and verifying the delivery hose 190 fluidly connects the specific control valve 110 or hose adaptor 118 to the correct tank delivery connector 150.

In some embodiments, the electronic control unit 130 may confirm that each delivery hose 190a, 190b is properly connected to the distribution tank 170a, 170b and a tank compartment 104a, 104b, as described hereinabove. In these embodiments, the electronic control unit 130 may prevent the discharge or unloading of product from any tank compartment 104 until at least one connection is confirmed. To prevent the discharge or unloading of product from any tank compartment 104 until at least one connection is confirmed, the electronic control unit 130 may prevent operation of the solenoid valves 120a, . . . , 120f, thereby maintaining the internal valves 116a, . . . , 116b in the normally closed configuration until at least the connections are confirmed. The electronic control unit 130 may also maintain each of the control valves 110a, . . . , 110b in the normally locked configuration until the connections are confirmed.

Once the connections are made, the first tank compartment 104a may be fluidly coupled or connected to the first delivery hose 190a, the first tank delivery connector 150a, and the first distribution tank 170a. Similarly, once the connections are made, the second tank compartment 104b may be fluidly coupled to the second delivery hose 190b, the second tank delivery connector 150b, and the second distribution tank 170b. Similarly, any of the tank compartments 104a, . . . , 104b may be fluidly coupled to either of the delivery hoses 190a, 190b, delivery connectors 150a, 150b, or delivery tanks 170a, 170b.

Once the connections are confirmed by the electronic control unit 130, the electronic control unit 130 may operate to confirm that the fluid connections will not cross-contaminate the liquid products stored in the respective distribution tanks 170a, 170b. Referring to FIGS. 1 and 3, in some embodiments, product verification may begin when the tank delivery connector 150 is locked on to the corresponding distribution tank 170. In some embodiments, the tank delivery connector 150 may include a locking lever 151 and a lock sensor 157, as described above, and power to the tank tag reader 152 may only be provided when the locking lever 151 is in the locked position. Once the first locking lever 151a is in the locked position, the first tank tag reader 152a may interrogate a first tank tag 174a to retrieve the liquid product type in the first distribution tank 170a, and other information encoded on the first tank tag 174a. Alternatively, in other embodiments, the operator may manually actuate a switch on the first tank delivery connector 150a to manually wake-up the first tank tag reader 152a. Once the first tank tag reader 152a is powered on, the first tank tag reader 152a may interrogate the first tank tag 174a and may transmit a stored liquid type signal indicative of the stored liquid type to the electronic control unit 130.

The electronic control unit 130 may be configured to communicate with a limited number of tank tag readers. For example, the first tank tag reader 152a and the second tank tag reader 152b may be registered with the electronic control unit 130, such as by being paired with the electronic control unit 130. The registration of one or more tank tag readers 152a, 152b to the electronic control unit 130 may eliminate any cross-talk with other tank tag readers from other product delivery trucks at the same distribution station.

The electronic control unit 130 may compare the stored liquid type to the transported liquid type for each of the tank compartments 104. The electronic control unit 130 may retrieve the transported liquid type from the memory module 134, in which the transported liquid type was stored once determined during the loading process. Additionally, the electronic control unit 130 may receive a transported fluid property signal from the FPS 106 during the unloading process. As previously described, the transported fluid property signal may be indicative of at least one of a viscosity of the liquid product in the tank compartment 104, a density of the liquid product in the tank compartment 104, a dielectric constant of the liquid product in the tank compartment 104, and/or a temperature of the liquid product in the tank compartment 104. The electronic control unit 130 may determine a transported liquid type of liquid product in the tank compartment 104 based on the transported fluid property signal sent from the FPS 106. For example, in some embodiments, the electronic control unit 130 may include a liquid type look-up table (LUT) stored in memory. The look-up table may contain a plurality of liquid types indexed according to one or more properties at a specified temperature or temperatures. These properties may include the viscosity, density, and dielectric constant or combinations thereof. Using this LUT, the electronic control unit 130 may determine the liquid product stored in the tank compartment 104 based on the transported fluid property signal received from the FPS 106. In some embodiments, the electronic control unit 130 may alert the operator if the transported liquid type determined from the transported fluid property signal received from the FPS 106 is different than the transported liquid type stored in the memory module 134 after initially loading the tank compartment.

The electronic control unit 130 may receive the stored liquid product type signal from the first tank delivery connector 150*a* and may store it in the computer-readable medium. The electronic control unit 130 may then compare the stored liquid type to the transported liquid type contained in any of the tank compartments 104*a*, . . . , 104*f* of the product transport vehicle 102 to determine if a match is present. In some embodiments, if the electronic control unit 130 determines that any tank compartment 104*a*, . . . , 104*f* contains a transported liquid type matching that of the stored liquid type, the electronic control unit 130 may transition the corresponding control valve 110 of that tank compartment 104*fa*, . . . , 104*f* from the normally locked state to the unlocked state, thereby allowing the control valve 110 to be opened by the operator. Additionally or alternatively, if the electronic control unit 130 determines that any tank compartment 104*a*, . . . , 104*f* contains a transported liquid type matching that of the stored liquid type, the electronic control unit 130 may enable operation of the solenoid valve 120*a*, . . . , 120*f* to transition the internal valve 116*a*, . . . , 116*f* associated with the tank compartment from a normally closed position to an open position. For example, the electronic control unit 130 may enable operation of the solenoid valves 120*a*, . . . , 120*f* by allowing the electronic control unit 130 to receive a user input from the user input hardware 138 to open the internal valve 116 or by allowing the electronic control unit 130 to transmit an open signal to the solenoid valve in response to receiving a user input to open the internal valve 116. Opening the internal valve 116 and unlocking the control valve 110 may enable the operator to cause the liquid product in the tank compartment 104 to flow from the tank compartment 104 to the distribution tank 170.

If the electronic control unit 130 determines that a tank compartment 104*a*, . . . , 104*f* does not contain a transported liquid type matching that of the stored liquid type, the electronic control unit 130 may maintain the internal valve 116 in the normally closed configuration to prevent the flow of liquid product to or from the tank compartment 104. For example, in some embodiments, the electronic control unit 130 may prevent receiving a user input from the user input hardware 138 to open the internal valve 116 or may prevent the electronic control unit 130 from transmitting an open signal to the solenoid valve 120 for the tank compartment 104. Additionally or alternatively, in some embodiments, the electronic control unit 130 may maintain the corresponding control valve 110 of that tank compartment 104 in the normally locked state, thereby preventing the release of liquid product from the tank compartment 104.

Once the electronic control unit 130 has determined that at least one tank compartment 104*a*, . . . , 104*f* contains a transported liquid type that matches the stored liquid type, the electronic control unit 130 may enable the operator to open the internal valve 116 by receiving the user input from the user input hardware 138 to open the solenoid valve 120, thereby opening the corresponding internal valve 116. The electronic control unit 130 may also transition the control valve from the normally locked configuration to the unlocked configuration to start the flow of liquid product from the tank compartment 104.

In some embodiments, the electronic control unit 130 may receive a solenoid valve open signal from the first solenoid valve sensor 122*a* indicating that the first internal valve 116*a* of the tank compartment 104*a* is in the open position. In some embodiments, the electronic control unit 130 may display a message that the first internal valve 116*a* is in the open configuration on the display 144. In these embodiment, the electronic control unit 130 may prevent any other solenoid valves 120*b*, . . . , 120*f* corresponding to any other tank compartments 104*b*, . . . , 104*f* from being opened until the first solenoid valve 120*a* for the internal valve 116*a* of the first tank compartment 104*a* has been transitioned to the normally closed configuration after being opened. Once the internal valve 116*a* corresponding to the first tank compartment 104*a* has been closed, the electronic control unit 130 may allow the operator to repeat similar steps to fill the second distribution tank 170*b* from the second tank compartment 104*b* with either the same liquid product type or a different liquid product type.

In some embodiments, if the electronic control unit 130 detects a liquid product mismatch during one or more of the above connection sequences, the electronic control unit 130 may provide the operator with a visual and/or audible warning that a mismatch has been determined. For example, in some embodiments the electronic control unit 130 may display a warning to the operator on the display 144. In other embodiments, the electronic control unit 130 may provide an audible alert to notify the operator of the liquid product mismatch.

Referring to FIGS. 1-3, in some embodiments, the FPS 106 may be positioned in the pipe connection between the internal valve 116 and the control valve 110. When the pipe connection is dry, such as when there is no liquid in pipe connection between the internal valve 116 and the control valve 110 due to initially loading the tank compartment 104 through the manlid in the top portion of the tank compartment 104, the FPS 106 may transmit, or alternately the electronic control unit 130 may read, a pipe condition signal indicative of a pipe condition (i.e., the FPS 106 is unable to determine the status and/or type of the liquid). Upon receipt of this pipe condition signal, the electronic control unit 130 may indicate on the display 144 that the FPS 106 is not able to determine the transported liquid type in the tank compartment 104. For example, the fluid product type matching process may be initiated by waking-up the first tank tag reader 152*a*, as described above. The first tank tag reader 152*a* may interrogate the first tank tag 174*a* to retrieve the stored liquid type indicative of the liquid product in the first distribution tank 170*a* and may transmit the stored liquid type signal encoding the stored liquid type to the electronic control unit 130. The electronic control unit 130 may then transition the first solenoid valve 120a to an open configuration to open the first internal valve 116a or may allow the operator to input a user input to open the first internal valve 116a. The electronic control unit 130 may also transition the first control valve 110a corresponding to the first tank compartment 104a to the unlocked state from the normally locked state. This condition may enable the operator and/or the electronic control unit 130 to flood the pipe connection between the first internal valve 116a and the first control valve 110. The FPS 106a associated with the first tank compartment 104a may then sense the liquid product in the first tank compartment 104a and may send a transported liquid type signals for the first tank compartment 104a to the electronic control unit 130. Once the FPS is able to sense the liquid product, the electronic control unit 130 may return the first internal valve 116a to the normally closed position and the first control valve 110a to the normally locked position to again prevent flow of liquid product out of the first tank compartment 104a. The same process may be used to determine the liquid type in each of the tank compartments 104a, . . . , 104f. Once the electronic control unit 130 has determined the transported liquid type of each tank compartment, electronic control unit 130 may compare the transported liquid type to the stored liquid type in each of the distribution tanks 170a, 170b. For each tank compartment 104 which contains a transported liquid type which matches the stored liquid type, the electronic control unit 130 may transition the control valve 110 corresponding to each compartment with the matching transported liquid type from a normally locked state to an unlocked state and may enable the operator to open the solenoid valve 120 to open the internal valve 116 corresponding to each compartment with the matching transported liquid type to allow the unloading of the liquid product from the tank compartment 104 by the operator. For those tank compartments 104 in which the transported liquid type and the stored liquid type do not match, the electronic control unit 130 will maintain the corresponding control valve 110 in the normally locked state to ensure that the liquid product from tank compartment is not unloaded and may also alert the operator to the mismatch. The electronic control unit 130 may also maintain the internal valve 116 in the normally closed position by maintaining the solenoid valve 120 in the closed position and/or disallowing the operator to open the internal valve 116 using the electronic control unit 130.

In embodiments where the FPS 106 is positioned in the tank compartment 104, this process to flood the pipe connection between the internal valve 116 and the control valve 110 may not be needed.

As indicated above, in some embodiments electronic control unit 130 may transition the control valves 110 corresponding to each tank compartment 104 from the normally locked state to the unlocked state when the tank compartment 104 is determined to contain a transported liquid type which matches the stored liquid type in a distribution tank 170. The electronic control unit 130 may also enable the operator to open the internal valve 116 associated with the tank compartment 104 when the tank compartment 104 is determined to contain a transported liquid type which matches the stored liquid type in one of the distribution tanks 170. This may allow the operator to then control the unloading of the liquid product manually by opening or closing the control valve 110.

Referring to FIGS. 1-3, if the FPS 106 indicates a dry status (i.e., there is no liquid product in the tank compartment 104), the electronic control unit 130 may cause an "empty" status to be displayed on the display 144 for that tank compartment 104. If the FPS 106 indicates a wet status after an unloading operation has been completed, such as by the operator or the electronic control unit 130 closing the solenoid valve 120 to close the internal valve 116 of the tank compartment 104, the electronic control unit 130 may display a warning on the display 144. For example, in one embodiment, the electronic control unit 130 may display "Prior Product Grade" and "Retained Product" and "Frustrated Load" in alternating messages. The electronic control unit 130 may take other actions in response to the FPS 106 continuing to transmit a wet signal to the electronic control unit 130, such as providing an audible alarm or disallowing a loading or unloading operation to commence.

The electronic control unit 130 may display an "unloading" status on the display 144 as the liquid product is being unloaded from the tank compartment 104 into the distribution tank 170. The FPS 106 may monitor the liquid product and transmit to the electronic control unit 130 a wet status or a dry status. The electronic control unit 130 may use the wet status and the dry status to update the computer-readable medium with information on whether any liquid product remains in the tank compartment 104 after unloading is complete.

In some embodiments, the electronic control unit 130 may include machine readable instructions that, when executed by the processor, cause the electronic control unit to receive the tank tag indicator from the tank tag reader 152, determine a stored liquid type associated with a distribution tank 170 based on the tank tag indicator, compare the stored liquid type to a transported liquid type of a liquid product stored in the tank compartment 104, maintain the internal valve 116 in the normally closed configuration when the stored liquid type and the transported liquid type do not match to prevent the flow of liquid product to or from the tank compartment 104, and when the stored liquid type and the transported liquid type match, receive a user input from the user input hardware 138 to open the internal valve 116 and transmit an open internal valve signal to the solenoid valve 120 to transition the internal valve 116 from the normally closed configuration to an open configuration, thereby permitting the flow of liquid product to or from the tank compartment 104. In some embodiments, the machine readable instructions, when executed by the processor, cause the electronic control unit 130 to receive a user input from the user input hardware 138 to open the main air valve 204 and transmit an open signal to the main air valve 204 to transition the main air valve 204 from a normally closed configuration to an open configuration. In some embodiments, the open signal may be transmitted to the main air valve actuator 205 operatively coupled to the main air valve 204 to thereby open the main air valve 204.

In some embodiments, the machine readable instructions, when executed by the processor, may cause the electronic control unit 130 to maintain the control valve 110 in the normally locked state when the stored liquid type and the transported liquid type do not match to prevent the flow of liquid product from the tank compartment 104, and transition the control valve 110 from the normally locked state to an unlocked state when the stored liquid type and the transported liquid type match, thereby permitting the flow of liquid product from the tank compartment 104.

Having described the various system components, the various graphical user interfaces displayed on the display 144 during various system operations. While the below description is provided with respect to a product delivery vehicle that carries fuel in a plurality of tank compartments of the product delivery, the graphical user interfaces described below would be equally applicable to a product delivery vehicle that carries liquids other than fuel.

Figure 6:
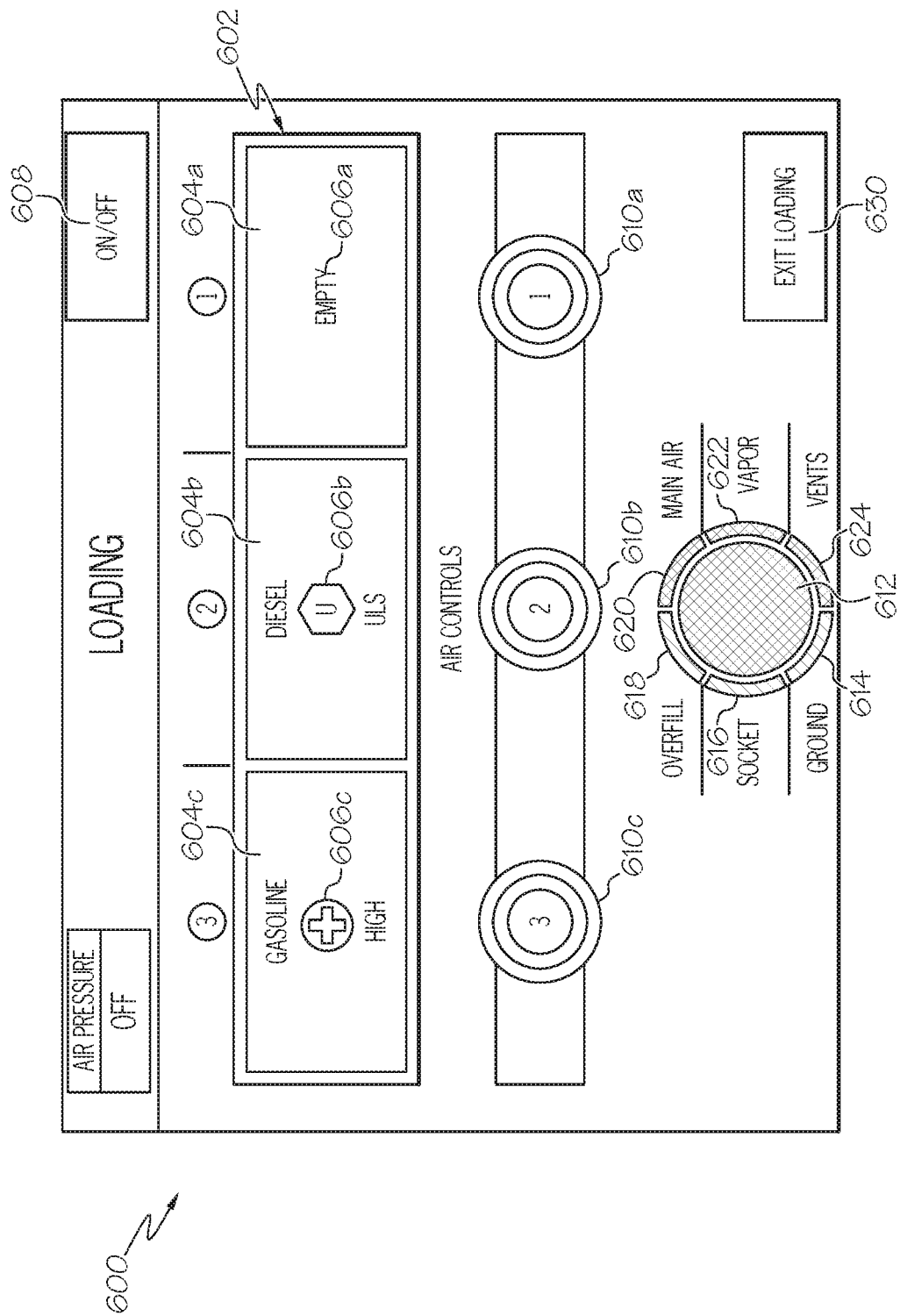
FIG. 6 schematically depicts a loading graphical user interface, according to one or more embodiments of the present disclosure.

Referring now to FIG. 6 in conjunction with FIGS. 1 and 5, a crossover protection system graphical user interface 300 that is displayed on the display 144 is depicted. In some embodiments, the graphical user interface 600 is displayed when the product delivery vehicle system 100 powers on. In other embodiments, the graphical user interface 600 may be displayed in response to receiving user input indicative of a desire to enter a loading mode (e.g., when a loading button is displayed on the display 144 and a signal indicative of a selection of the loading button is received from the user input device 138, from the display 144 (when the display 144 is a touchscreen), from the microphone 140, or the like). In some embodiments, the graphical user interface 600 may be displayed in response to detecting the presence of a socket or other component that interfaces with the product delivery vehicle 102 when the product delivery vehicle 102 is at a loading station. The graphical user interface 600 may be displayed during a loading mode in which the product delivery vehicle system 100 sets the liquid type in each of the plurality of tank compartments 104a, . . . , 104f of the product delivery vehicle 102. The graphical user interface 600 may include a schematic representation of the product delivery vehicle 602. The graphical user interface 600 may also include an exit loading button 630 and a settings button (not shown).

Still referring to FIG. 6 in conjunction with FIGS. 1 and 5, the schematic representation of the product delivery vehicle 602 includes a plurality of tank compartment graphics 604, including a first tank compartment graphic 604a, a second tank compartment graphic 604b, and a third tank compartment graphic 604c. Although the schematic representation of the product delivery vehicle 602 is shown in FIG. 6 as having 3 tank compartment graphics 604, it is understood that the schematic representation of the product delivery vehicle 602 may have more or less than 3 tank compartment graphics 604, such as 1, 2, 4, 5, 6, or more than 6 tank compartment graphics 604. Each tank compartment graphic 604 may be associated with a tank compartment 104 of the product delivery vehicle 102 and may depict a graphical representation of the associated tank compartment 102. In particular, the first tank compartment graphic 604a may be associated with the first tank compartment 104a, the second tank compartment graphic 604b may be associated with the second tank compartment 104b, and the third tank compartment graphic 604c may be associated with the third tank compartment 104c.

Still referring to FIG. 6 in conjunction with FIG. 5, a plurality of graphical indications of liquid type 606a, . . . , 606c is schematically depicted. The plurality of graphical indications of liquid type 606a, . . . , 606c may include a first graphical indication of liquid type 606a, a second graphical indication of liquid type 606b, and a third graphical indication of liquid type 606c. The first graphical indication of liquid type 606a may be displayed proximate the first tank compartment graphic 604a, thereby indicating that the first tank compartment 104a includes a first liquid type indicated by the first graphical indication of liquid type 606a. The second graphical indication of liquid type 606b may be displayed proximate the second tank compartment graphic 604b, thereby indicating that the second tank compartment 104b includes a second liquid type indicated by the second graphical indication of liquid type 606b. The third graphical indication of liquid type 606c may be displayed proximate the third tank compartment graphic 604c, thereby indicating that the third tank compartment 104c includes a third liquid type indicated by the third graphical indication of liquid type 606c. The first graphical indication of liquid type 606a, the second graphical indication of liquid type 606b, and the third graphical indication of liquid type 606c may also indicate whether the first tank compartment 104a, the second tank compartment 104b, or the third tank compartment 104c is empty (i.e., does not contain a liquid product), respectively. In the embodiments represented in FIG. 6, the first graphical indication of liquid type 606a indicates that the first tank compartment 104a includes high grade unleaded gasoline, the second graphical indication of liquid type 606b indicates that the second tank compartment 104b includes ultra low sulfur diesel fuel, and the third graphical indication of liquid type 606c indicates that the third tank compartment 104c does not contain any liquid product (i.e., is empty). Each of the plurality of graphical indications of liquid type 606a, . . . , 606c may include text (e.g., the text "Ultra Low Sulfur," "Unleaded," "Mid Grade," "Low Grade," etc.). Each of the plurality of graphical indications of liquid type 606a, . . . , 606c may include a symbol representative of the liquid type, such as a grade of fuel for example (e.g, the "U" depicted inside a hexagon to depict ultra low sulfur diesel). Each of the plurality of graphical indications of liquid type 606a, . . . , 606c may also be color coded according to liquid type, fuel category, fuel grade, or the like.

Still referring to FIG. 6 in conjunction with FIG. 5, in order to graphically indicate the liquid type included in each tank compartment of the product vehicle with the appropriate graphical indications of liquid type, the product delivery vehicle system 100 must first determine the liquid type included in each tank compartment. In some embodiments, the product delivery vehicle system 100 may determine the liquid type in a particular tank compartment automatically based on a liquid property signal indicative of a sensed fluid property (e.g., a viscosity, a density, a dielectric constant, a temperature, etc.) output by one of the plurality of fluid property sensors 106a, . . . , 106f. For example, the liquid type in the first tank compartment 104a may be determined to be unleaded high grade gasoline based on a sensed fluid property signal output by the first fluid property sensor 106a, such as by using a look-up table or function to determine the liquid type associated with the sensed fluid property signal. In other embodiments, the user may manually input the liquid type included in one or more tank compartments. For example, in some embodiments, a user may provide input to the user input hardware 138 and/or the display 144 (in embodiments in which the display 144 is a touchscreen) indicative of a liquid type included in a particular tank compartment. For example, a user may provide user input via the user input hardware 138 and/or the display 144 (in embodiments in which the display 144 is a touchscreen) indicative that the second tank compartment 104b includes an ultra low sulfur diesel fuel for example. In some embodiments, the system may detect that a particular category of liquid product that is included in a particular tank compartment based on a sensed signal output by a fluid property sensor, and may then prompt the user to select a grade of the detected category of liquid product. For example, the category of liquid product in the first tank compartment 104a may be determined to be gasoline based on a sensed fluid property signal output by the first FPS 106a, such as by using a look-up table or function to determine the liquid type associated with the sensed fluid property signal.

Figure 7A:
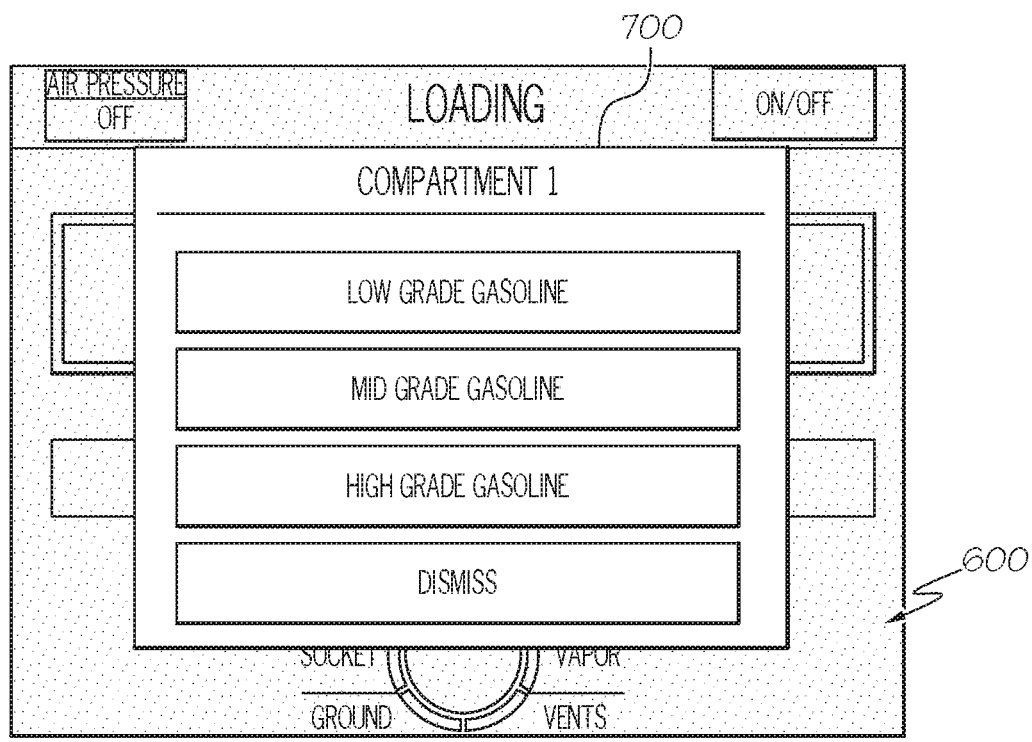
FIG. 7A schematically depicts a gasoline grade selection graphical user interface, according to one or more embodiments of the present disclosure.
Figure 7B:
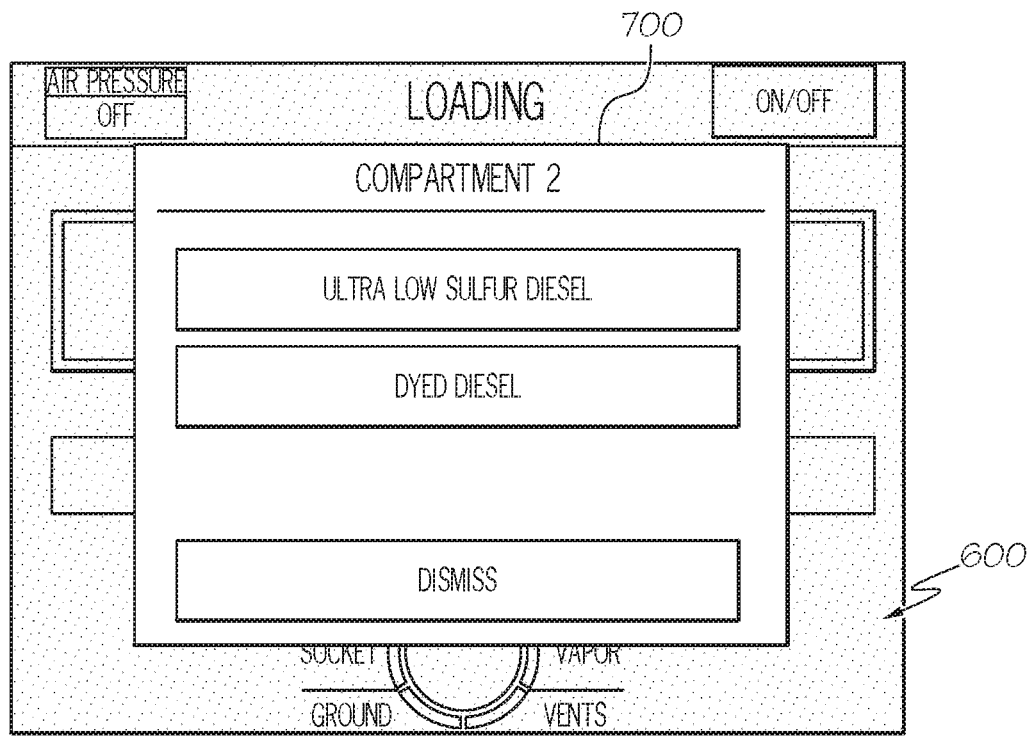
FIG. 7B schematically depicts a diesel fuel grade selection graphical user interface, according to one or more embodiments of the present disclosure.

Referring to FIGS. 7A and 7B, the user may be provided a graphical user interface 700a, 700b displayed on the display 144 that prompts the user to input a specific type of liquid product, such as a specific liquid product within a category of liquid products identified by the electronic control unit 130 using the transported liquid product signal received from the FPS 106. For Example in FIG. 7A, the graphical user interface 700a may prompt the user to enter the specific grade of gasoline. In FIG. 7B, the graphical user interface 700b may prompt the user to enter a specific grade of diesel fuel. Referring again to FIG. 7A, in response to the display of the graphical user interface 700a the user may provide input via the user input hardware 138 and/or the display 144 (in embodiments in which the display 144 is a touchscreen) indicative of the grade of gasoline. For example, the user may provide input indicating that the grade of gasoline is low and the system may set the fuel type of the tank compartment 104 to be low grade unleaded gasoline based on both the sensed fluid property signal output by the fluid property sensor 106 and the user input indicative of the fuel grade.

Referring back to FIG. 6, in some embodiments, the fuel type may be determined as empty based on a signal output by one of the plurality of pressure sensors 108a, . . . , 108f. For example, the product delivery vehicle system 100 may determine that the first tank compartment 104a is empty based on an output signal from the first pressure sensor 108a. The first graphical indication of liquid type 606a of the graphical user interface 600 may indicate that the first tank compartment 104a is empty.

Referring again to FIG. 6 and considering FIG. 2, the graphical user interface 600 may also include a plurality of air control system indicators, such as a main air indicator 608 and one or more solenoid valve indicators 610a, . . . , 610c. The main air indicator 608 may indicate whether the main air valve 204 is in the open configuration or the closed configuration. For example, the main air indicator 608 may indicate the configuration of the main air valve 204 by using different colors for the open configuration and the closed configuration and may change the color of the main air indicator 608 in response to a change in the configuration of the main air valve 204. In some embodiments, the main air indicator 608 may be functional fields and may be operable to receive a user input to open or close the main air valve 204.

Each of the solenoid valve indicators 610a, . . . , 610c may be associated with one of the tank compartments 104a, . . . , 104c, and may be aligned with or positioned proximate to the corresponding tank compartment graphics 604a, . . . , 604c on the graphical user interface 600. Each of the solenoid valve indicators 610a, . . . , 610c may indicate whether the corresponding solenoid valve 120a, . . . , 120c, is in the open configuration or the closed configuration. For example, the solenoid valve indicators 610a, . . . , 610c may indicate the configuration of the corresponding solenoid valves 120a, . . . , 120c by using different colors to indicate the open configuration and the closed configuration and may change the color of the solenoid valve indicator 610a, . . . , 610c in response to a change in the configuration of the corresponding solenoid valve 120a, . . . , 120c. In some embodiments, each of the solenoid valve indicators 610a, . . . , 610c may be a functional field, such as when the display 144 is a touchscreen. In some embodiments, each of the solenoid valve indicators 610a, . . . , 610c may be operable to receive a user input to open or close the corresponding solenoid valve 120a, . . . , 120c, thereby opening or closing the corresponding internal valve 116.

Referring still to FIG. 6, in some embodiments, the graphical user interface may include a loading precondition indicator 612, which may be operable to display the status of the various components of the product delivery vehicle system 100 (FIG. 5) and/or the loading system 500 (FIG. 5). In some embodiments, the loading precondition indicator 612 may indicate the status of each component or system associated with the loading process. In some embodiments, the loading precondition indicator 612 may include one or more of a ground status indicator 614, a socket indicator 616, an overfill condition indicator 618, a main air on indicator 620, a vapor adaptor indicator 622, or a vent indicator 624. The ground indicator 614 may indicate whether an electrical ground has been properly established, such as by properly connecting a ground cable from the product delivery vehicle 102 to a ground and/or the loading system. The socket indicator 616 may indicate whether an electrical connector has been coupled to the socket of the product delivery vehicle 102 to electrically couple the product delivery vehicle 102 to the loading system for providing power and/or control signals between the product delivery vehicle 102 and the loading system. The overfill condition indicator 618 may provide a graphical indication of whether an overfill condition has been detected by one of the overfill sensors 210 (FIG. 1). Additionally or alternatively, in some embodiments, the overfill condition indicator 618 may also indicate whether the electronic control unit 130 is transmitting an overfill condition signal to the loading system. The main air on indicator 620 may provide an indication of whether the main air valve 204 (FIG. 2) has been opened to provide air to the plurality of solenoid valves 120 and other components of the product delivery vehicle 102. The vapor adaptor indicator 622 may provide an indication of whether the vapor adaptor connector has been properly connected to recover volatile vapors from the loading process. The vent indicator 624 may indicate whether the vent on the tank compartment 102 being loaded is in an open position.

In some embodiments, the electronic control unit 130 may require each condition represented by the indicators in the loading precondition indicator 612 to be satisfied before the electronic control unit 130 will enable the operator to open an internal valve 116 using one of the solenoid valve indicators 610a, . . . , 610c to start loading the tank compartment 104. For example, the electronic control unit 130 may require one or more of the following conditions: properly grounding the product delivery vehicle 102, connecting the electrical connection to the socket, the overfill sensors 210 are not transmitting an overfill condition signal, the main air valve 204 is open, the vapor recovery system is turned on and positioned, and the vent to the tank compartment 104 is open. In some embodiments, as each required precondition is satisfied, the corresponding indicator of the loading precondition indicator 612 may graphically indicate that the precondition is satisfied, such as by changing the color of the indicator. Once all of the preconditions are satisfied, the loading precondition indicator 612 may change color to indicate that all preconditions have been satisfied. In some embodiments, once all of the preconditions are satisfied as indicated by the loading precondition indicator 612, the electronic control unit 130 may enable the functionality of one or more than one of the solenoid valve indicators 610a, . . . , 610c of the graphical user interface 600. Once enabled by the electronic control unit 130, the solenoid valve indicators 610a, . . . , 610c may receive input from the operator, such as by the operator selecting or touching one or more of the solenoid valve indicators 610a, . . . , 610c on the graphical user interface 600 to actuate the solenoid valve 120, thereby opening the internal valve 116 associated with the tank compartment 104 being loaded.

Figure 11:
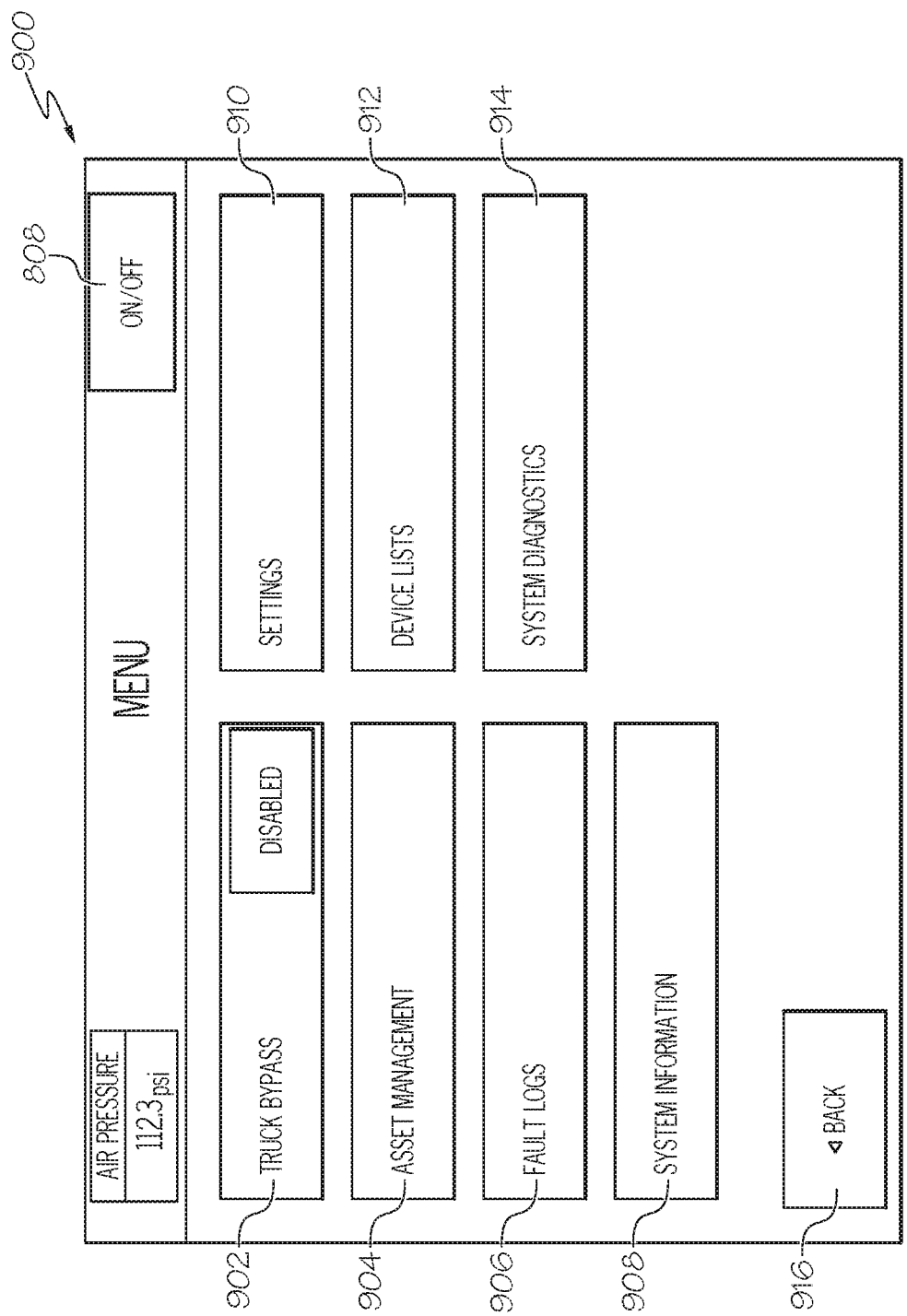
FIG. 11 schematically depicts a menu graphical user interface, according to one or more embodiments of the present disclosure.

Referring still to FIG. 6, the graphical user interface 600 may also include an exit loading button 630 which may be operable to transition from the graphical user interface 600 to a main menu, such as the main menu included in the graphical user interface 900 illustrated in FIG. 11, for example.

Figure 8:
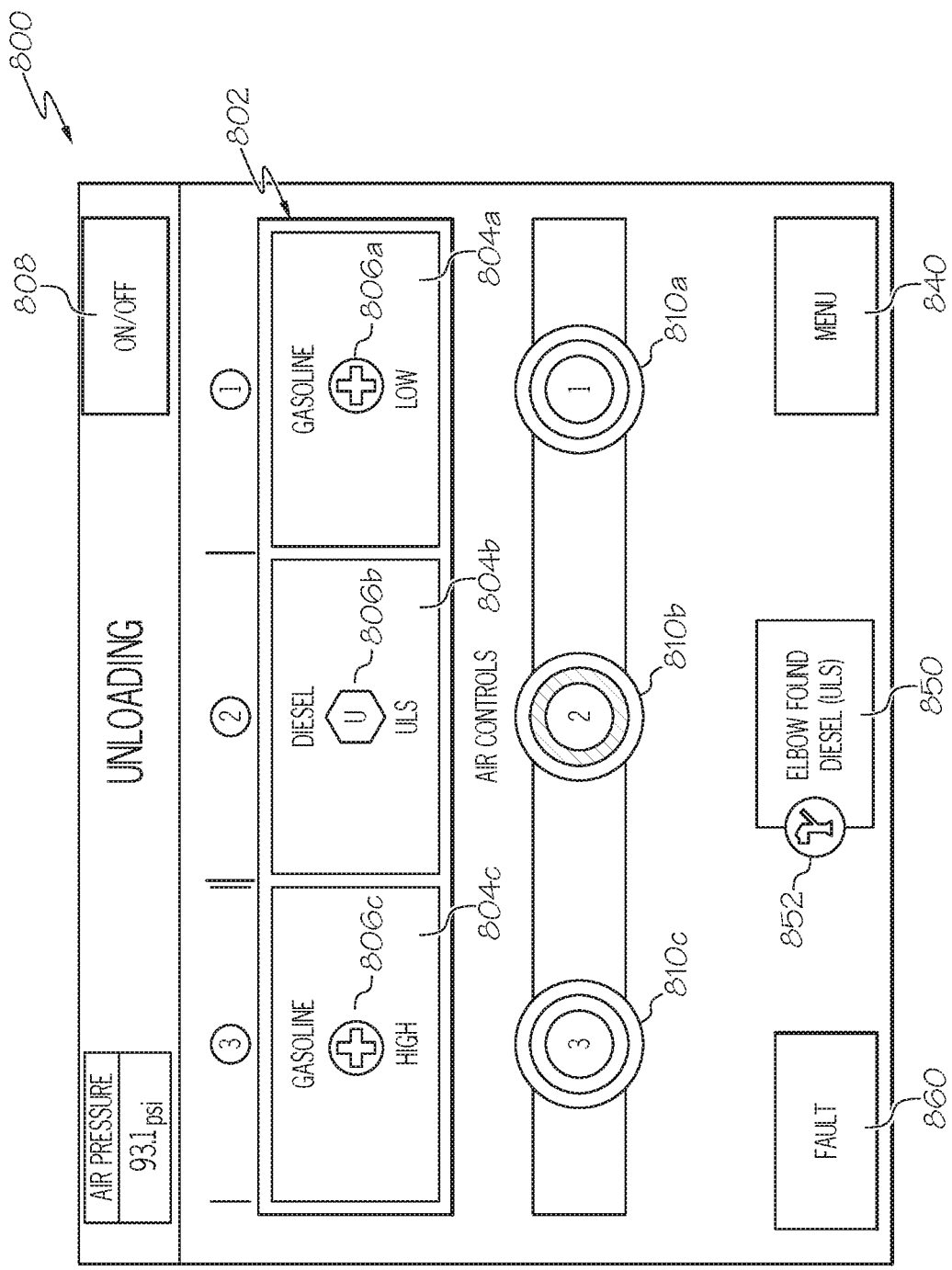
FIG. 8 schematically depicts a graphical user interface for unloading, according to one or more embodiments of the present disclosure.
Figure 9:
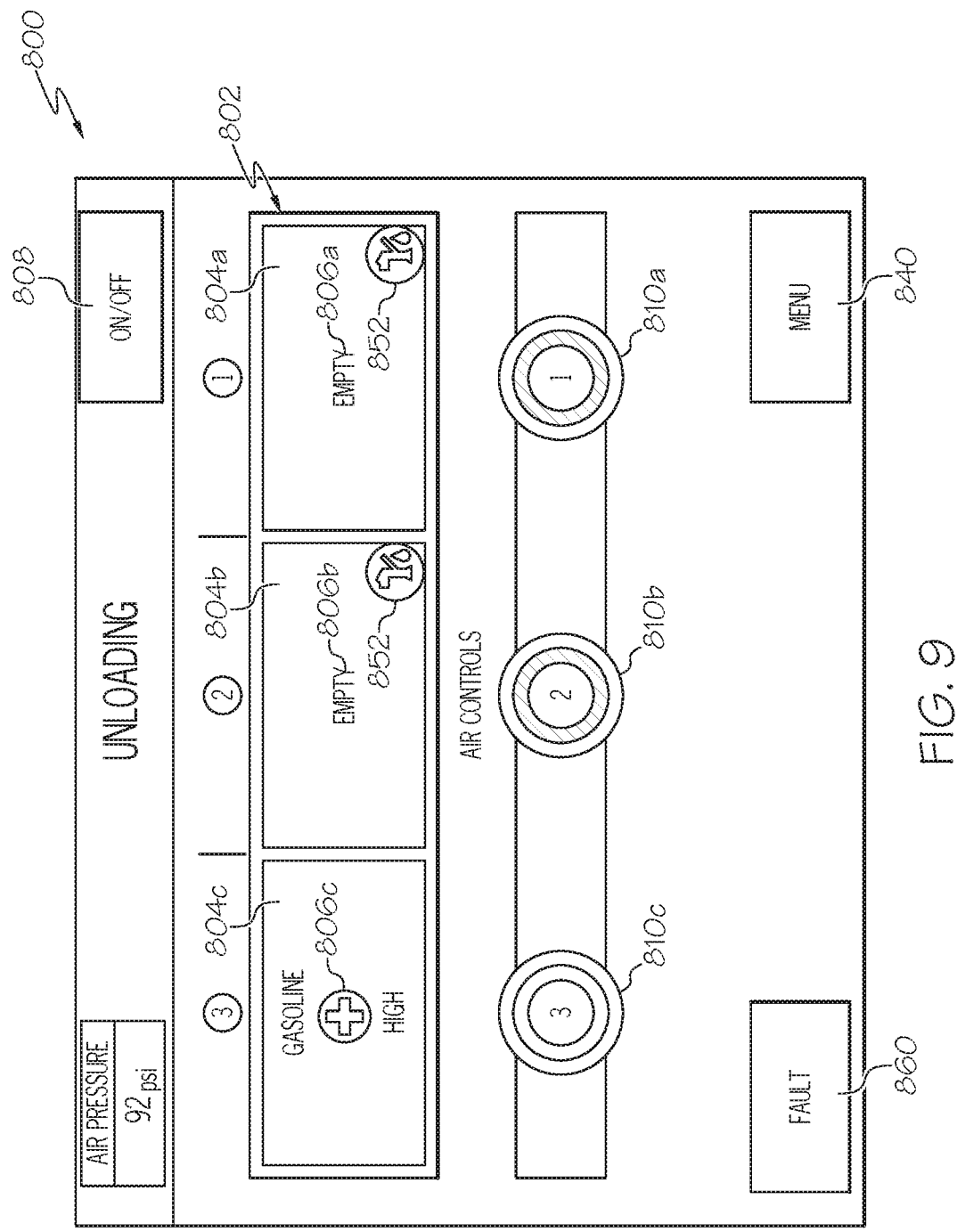
FIG. 9 schematically depicts the graphical user interface of FIG. 8 in which two tank compartments of a product delivery vehicle have been unloaded, according to one or more embodiments of the present disclosure.
Figure 10:
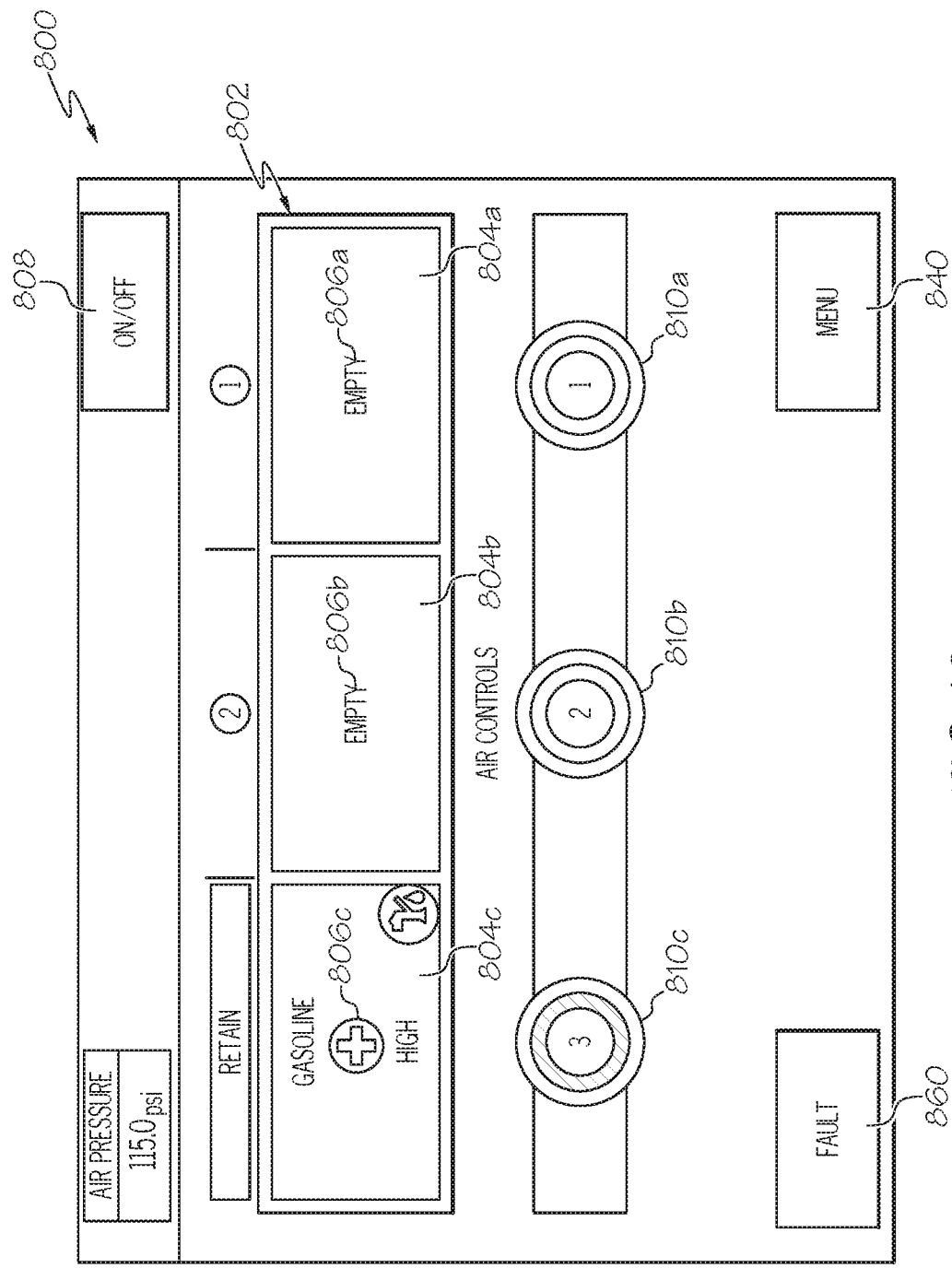
FIG. 10 schematically depicts the graphical user interface of FIG. 8 in which a retain indicator is displayed for a tank compartment of the product delivery vehicle, according to one or more embodiments of the present disclosure.

Referring now to FIGS. 8-10 in conjunction with FIGS. 1-3, a graphical user interface 800 for unloading the liquid product from one or more of the tank compartments 104 is depicted. The graphical user interface 800 may include a schematic representation of the product delivery vehicle 802. The graphical user interface 800 may also include a menu button 840 to navigate to a main menu. The schematic representation of the product delivery vehicle 802 may include a plurality of tank compartment graphics, including a first tank compartment graphic 804a, a second tank compartment graphic 804b, and a third tank compartment graphic 804c. The tank compartment graphics 804a, ..., 804c may be similar to the tank compartment graphics 604a, ..., 604c previously described in relation to graphical user interface 600 in FIG. 6. The graphical user interface 800 may also include a plurality of graphical indications of liquid type 806a, ..., 806c. The plurality of graphical indications of liquid type 806a, ...,806c may include a first graphical indication of liquid type 806a, a second graphical indication of liquid type 806b, and a third graphical indication of liquid type 806c. Each of the plurality of graphical indications of liquid type 806a, ..., 806c may be associated with one of the tank compartment graphics 804a, ..., 804c. The plurality of graphical indications of liquid type 806a, ..., 806c may provide an indication of the transported liquid type of the liquid product contained in each of the tank compartments 104, as previously described in relation to the plurality of graphical indications of liquid type 606a, ..., 606c of FIG. 6.

Referring again to FIG. 8 and considering FIG. 2, the graphical user interface 800 may also include a plurality of air control system indicators, such as a main air indicator 808 and one or more solenoid valve indicators 810a, ..., 810c. The air control system indicators on the graphical user interface 800 enable the operator to control components of the air system 200 of the product delivery vehicle 102 through the electronic control unit 130 using the user input hardware 138, such as a touchscreen or other input device. The main air indicator 808 may indicate whether the main air valve 204 is in the open configuration or the closed configuration. For example, the main air indicator 808 may indicate the configuration of the main air valve 204 by using different colors for the open configuration and the closed configuration and may change the color of the main air indicator 808 in response to a change in the configuration of the main air valve 804. In some embodiments, the main air indicator 808 may be functional fields and may be operable to receive a user input to open or close the main air valve 204.

Each of the solenoid valve indicators 810a, ..., 810c may be associated with one of the tank compartments 104a, ..., 104c, and may be aligned with or positioned proximate to the corresponding tank compartment graphics 804a, ..., 804c on the graphical user interface 800. Each of the solenoid valve indicators 810a, ..., 810c may indicate whether the corresponding solenoid valve 120a, ..., 120c, is in the open configuration or the closed configuration. For example, the solenoid valve indicators 810a, ..., 810c may indicate the configuration of the corresponding solenoid valves 120a, ..., 120c by using different colors, shapes, patterns, or other graphical distinction to indicate the open configuration and the closed configuration and may change the color of the solenoid valve indicator 810a, ..., 810c in response to a change in the configuration of the corresponding solenoid valve 120a, ..., 120c. For example, in FIG. 8, the second solenoid valve indicator 810b is patterned to indicate that the second solenoid valve 120b is in an open configuration, thereby indicating that the second internal valve 116b is open. In FIG. 8, the first solenoid valve indicator 810a and the third solenoid valve indicator 810c are not patterned, indicated that they are in the normally closed configuration, thereby indicating that the first internal valve 116a and the third internal valve 116c are in the normally closed configuration. In FIG. 9, both the first solenoid valve indicator 810a and the second solenoid valve indicator 810b are patterned to indicate that the first solenoid valve 120a and the second solenoid valve 120b are in the open configuration, and the third solenoid valve indicator 810c is not patterned, indicating that the third solenoid valve 120c is in the closed configuration. FIG. 10 shows the third solenoid valve indicator 810c as patterned indicating that the third solenoid valve 120c is open and the first and second solenoid valve indicators 810a, 810b are not patterned indicating that the first and second solenoid valves 120a, 120b are in the normally closed configuration.

In some embodiments, each of the solenoid valve indicators 810a, ..., 810c may include a functional field, such as when the display 144 is a touchscreen. In some embodiments, each of the solenoid valve indicators 810a, ..., 810c may be operable to receive a user input to open or close the corresponding solenoid valve 120a, ..., 120c, thereby opening or closing the corresponding internal valve 116. For example, in FIG. 8, the second solenoid valve indicator 810b indicates that the second solenoid valve 120b is in the open configuration. The operator may press the first solenoid valve indicator 810a on the graphical user interface 800 to transition the first solenoid valve 120a from the closed configuration to the open configuration to thereby open the first internal valve 116a. Once the operator presses the first solenoid valve indicator 810a, the first solenoid valve indicator 810a may change appearance to indicate that the first solenoid valve 120a has been opened. FIG. 9 shows the first solenoid valve indicator 810a having a pattern similar to the second solenoid valve indicator 810b to indicate that the first solenoid valve 120a is open. When unloading is complete or when the operator need to close the internal valves, the operator may press the corresponding solenoid valve indicator 810 to close the solenoid valve, thereby closing the internal valve 116. For example, in FIG. 9, the operator may press the first solenoid valve indicator 810a and the second solenoid valve indicator 810b to transition the first solenoid valve 120a and the second solenoid valve 120b back to the normally closed configuration. FIG. 10 shows the first solenoid valve indicator 810a and the second solenoid valve indicator 810b as solid again indicating that the first and second solenoid valves 120a, 120b have been closed.

Referring still to FIG. 8, in conjunction with FIGS. 1-3, the graphical user interface 800 may include a tank delivery connector status portion 850 is schematically depicted. In some embodiments, when a tank delivery connector is paired with the product delivery vehicle system 100 (as will be described below), a tank delivery connector status graphic associated with the paired tank delivery connector will be displayed in the tank delivery connector status portion 850. The tank delivery connector status portion 850 may display status information for a plurality of tank delivery connectors, including the first tank delivery connector 150*a* and the second tank delivery connector 150*b*, each of which may be paired to the product delivery vehicle system 100. The status of the tank delivery connectors may include that the tank delivery connector has not yet been detected, that the tank delivery connector is idle (such as when the tank delivery connector has been paired with the product delivery vehicle system 100, but is not yet locked onto a distribution tank), that the tank delivery connector is locked into place on a distribution tank (which may be determined based on an output of the first lock sensor 157*a* or the second lock sensor 157*b*), that the tank delivery connector is searching for a tank tag (such as when the first tank tag reader 152*a* or the second tank tag reader 152*b* are activated, but have not yet read a tank tag), that the tank delivery connector has read the tank tag (such as when the first tank tag reader 152*a* or the second tank tag reader 152*b* have read a tank tag), that the tank delivery connector has read a tank tag of a particular fuel type (such as when the first tank tag reader 152*a* or the second tank tag reader 152*b* has read a tank tag and the tank delivery connector has transmitted a tank tag identifier indicative of the type of fuel included in the distribution tank associated with the tank tag), that liquid product is flowing through the tank delivery connector, etc. In some embodiments, the product delivery vehicle system 100 may determine the tank delivery connector status information to display based on information transmitted (e.g., wirelessly) from the tank delivery connector to the product delivery vehicle system 100. In some embodiments, the tank delivery connector may transmit information (e.g., an output based on a signal provided by the lock sensor, an output from the tank tag reader, an output from the hose tag reader, an output from the orientation sensor, etc.) to the product delivery vehicle system 100 once the tank delivery connector detects that it is upright (e.g., based on an output from the first orientation sensor 158*a* or the second orientation sensor 158*b*), that the tank delivery connector is locked into place (e.g., based on an output from the first lock sensor 157*a* or the second lock sensor 157*b*), and that the tank delivery connector has read the tank tag. The communication between the tank delivery connector and the product delivery vehicle system 100 may be encrypted. The status of multiple tank delivery connectors may be displayed in the tank delivery connector status portion 850. For example, the tank delivery connector status portion 850 may include a first tank delivery connector status graphic indicative of a status of the first tank delivery connector 150*a* and a second tank delivery connector status graphic indicative of a status of the second tank delivery connector 150*b* (locked and searching for a tag, as shown in FIG. 10).

In some embodiments, the graphical user interface 800 may display a graphical indication that a tank delivery connector 150 is associated with a particular tank compartment 104 of the product delivery vehicle 102, such as when the tank delivery connector 150 reads a tank tag 174 of a distribution tank 170 containing the same liquid type as contained with the tank compartment 104. In some embodiments, a tank delivery connector 150 may be associated with a particular tank compartment 104 of the product delivery vehicle 102 when: the tank delivery connector 150 transmits, via network interface hardware of the tank delivery connector 150, a tank tag indicator associated with a tank tag 174 of a distribution tank 170 that is read with the tank tag reader 152 of the tank delivery connector 150; the product delivery vehicle system 100 receives, via network interface hardware of the product delivery vehicle system 100, the tank tag indicator; the product delivery vehicle system 100 determines a distribution tank liquid type associated with the distribution tank 170 based on the tank tag indicator (e.g., by accessing a look-up table or other data structure); and the product delivery vehicle system 100 determines that the tank delivery connector is associated with the tank compartment 104 based on the tank tag indicator (e.g., when a fluid type associated with the tank tag indicator matches a fluid type of the tank compartment). In some embodiments, a tank delivery connector graphic 852 may be displayed proximate a tank compartment graphic 804*a*, . . . , 804*c* to indicate that a tank delivery connector 150 is associated with a tank compartment 104*a*, . . . , 104*c* associated with the tank compartment graphic 804*a*, . . . 804*c*. For example, with reference to FIGS. 1-3, the second tank delivery connector 150*b* may read the second tank tag 174*b* of the second distribution tank 170*b*; the second tank delivery connector 150*b* may transmit, via the second network interface hardware 156*b* of the second tank delivery connector 150*b*, a tank tag indicator associated with the second tank tag 174*b* (e.g., a tank tag indicator indicating that the second distribution tank 170*b* contains ultra low sulfur diesel fuel); the product delivery vehicle system 100 may receive, via the network interface hardware 136 of the product delivery vehicle system 100, the tank tag indicator; the product delivery vehicle system 100 may determine that the distribution tank fuel type is ultra low sulfur diesel fuel based on the tank tag indicator (e.g., by accessing a look-up table or other data structure); and the product delivery vehicle system 100 may determine that the second tank delivery connector 150*b* is associated with the second tank compartment 104*b* based on the tank tag indicator because the fuel type of the second tank compartment 104*b* is also ultra low sulfur diesel. With reference to FIG. 9, the second tank delivery connector status graphic (which is associated with the second tank delivery connector 150*b*) may then be displayed proximate the second tank compartment graphic 804*b* (which is associated with the second tank compartment 104*b*) to indicate that the second tank delivery connector 150*b* is associated with the second tank compartment 104*b*.

When liquid product is flowing from a particular tank compartment of the product delivery vehicle 102 to a distribution tank 170 through a particular tank delivery connector 150, the display 144 may display a tank delivery connector graphic 852 proximate the tank compartment graphic 804*a*, . . . , 804*c* from which the liquid product is flowing to indicate that the tank delivery connector 150 is associated with the tank compartment 104*a*, . . . , 104*c* from which liquid product is flowing through the tank delivery connector 150. For example, referring to FIG. 9, the tank delivery connector status graphic 852 may be displayed proximate the second tank compartment graphic 804*b* to indicate that ultra low sulfur diesel is flowing from the second tank compartment 804*b* through the tank delivery connector 150 and into a low sulfur diesel distribution tank on which the second tank delivery connector 150*b* is locked and fluidly coupled. The tank delivery connector status graphic 852 may indicate that the status of the tank delivery connector 150 is flowing.

In some embodiments, the status of a tank delivery connector 150 may be determined as flowing when a liquid type of a tank tag 174 read by the tank tag reader 152 of the tank delivery connector 150 matches a liquid type of the tank compartment 104*a*, . . . , 104*c* of the product delivery vehicle 102, a delivery hose 190 is determined to fluidly couple the distribution tank 170 to the tank delivery connector 150 (e.g., based on a hose tag read by a hose tag reader of the product delivery vehicle system 100 and a hose tag read by the hose tag reader of the tank delivery connector), the tank delivery connector 150 is locked onto the inlet of the distribution tank 170, and a control valve 110 and a solenoid valve 120 associated with the tank compartment 104 are determined to be open. For example, referring to FIGS. 1-3, the tank delivery connector 150 may be determined to be flowing when: a liquid type associated with the second tank tag 174*b* (which is read by the tank tag reader 152 of the tank delivery connector 150) matches a liquid type associated with the second tank compartment 104*b* (which may have been manually input by a user, automatically determined based on a signal from the second fluid property sensor 106*b*, or set based on a combination of manual input and a signal from the second fluid property sensor 106*b*, as described above); the second hose tag reader 114*b* reads the input-end hose tag 192 of the delivery hose 190 (indicating that the delivery hose 190 is fluidly coupled to the second tank compartment 104*b*); the hose tag reader 153 of the tank delivery connector 150 reads the output-end hose tag 194 of the delivery hose 190 (indicating that the delivery hose 190 is fluidly coupled to the tank delivery connector 150); the tank delivery connector 150 may be in a locked configuration (which may be determined based on an output signal from the lock sensor 157); the second control valve 110*b* is open (which may be determined based on an output signal from the second control valve sensor 112*b*); and the second solenoid valve 120*b* may be open (which may be determined based on an output signal from the second solenoid valve sensor 122*b*). In other embodiments, the status of the tank delivery connector 150 may be determined as flowing in another manner, such as in any way in which fluid is described to flow from a tank compartment 104 of a product delivery vehicle 102, through a tank delivery connector 150, and into a distribution tank 170, as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

In some embodiments, when a tank delivery connector 150 reads a tank tag 174 associated with a distribution tank 170, tank compartment graphics 804*a*, . . . , 804*c* that do not contain the same fuel type as the distribution tank 170 associated with the tank tag 174 may be displayed as inactive or locked out. In some embodiments, the inactive graphic indication may indicate whether a tank compartment 104 is locked out or inactive. The inactive graphic indication may be different than the tank compartment graphics 804*a*, . . . , 804*c*, such as in embodiments in which the inactive graphic indication is an inactive icon, a color that is different from the tank compartment graphics 804*a*, . . . , 804*c* that contain liquid product that is the same liquid type as the tank tag 174, etc. The inactive graphic indication is not displayed proximate to tank compartment graphics 804*a*, . . . , 804*c* for tank compartments 104 that are considered active and are not locked out.

Some embodiments may display a graphical indication that a tank delivery connector is associated with a particular tank compartment of the product delivery vehicle, such as when the tank delivery connector reads a tank tag of a distribution tank containing the same fluid type as contained with the tank compartment. In some embodiments, a tank delivery connector may be associated with a particular tank compartment of the product delivery vehicle 102 when: the tank delivery connector transmits, via network interface hardware of the tank delivery connector, a tank tag indicator associated with a tank tag of a distribution tank that is read with the tank tag reader of the tank delivery connector; the product delivery vehicle system 100 receives, via network interface hardware of the product delivery vehicle system 100, the tank tag indicator; the product delivery vehicle system 100 determines a distribution tank liquid type associated with the distribution tank based on the tank tag indicator (e.g., by accessing a look-up table or other data structure); and the product delivery vehicle system 100 determines that the tank delivery connector is associated with the tank compartment based on the tank tag indicator (e.g., when a fluid type associated with the tank tag indicator matches a fluid type of the tank compartment).

In some embodiments, tank compartments of the product delivery vehicle 102 that match the fluid type of a distribution tank 170 associated with a tank tag 174 are graphically distinguished from tank compartments that do not match the fluid type of the distribution tank 170 associated with the tank tag 174. For example, with reference to FIGS. 1-3, the first tank delivery connector 150*a* may read the first tank tag 174*a* of the first distribution tank 170*a*; the first tank delivery connector 150*a* may transmit, via the first network interface hardware 156*a* of the first tank delivery connector 150*a*, a tank tag indicator associated with the first tank tag 174*a* (e.g., a tank tag indicator indicating that the first distribution tank 170*a* contains high grade unleaded gasoline); the product delivery vehicle system 100 may receive, via the network interface hardware 136 of the product delivery vehicle system 100, the tank tag indicator; the product delivery vehicle system 100 may determine that the fluid type of the liquid product in the first distribution tank 170*a* is high grade unleaded gasoline based on the tank tag indicator (e.g., by accessing a look-up table or other data structure); and the product delivery vehicle system 100 may determine that the high grade unleaded gasoline fluid type of the third tank compartment 104*c* matches the high grade unleaded gasoline fluid type of the first distribution tank 170*a*, and may determine that the fluid types of the other tank compartments do not match the high grade unleaded gasoline fluid type of the first distribution tank 170*a*. The display 144 may then display a graphical user interface that graphically distinguishes the third tank compartment graphic 804*c* (associated with the third tank compartment 104*c*, which contains a liquid product that matches the fluid type of the first distribution tank 170*a*) from the second tank compartment graphic 804*b* and the first tank compartment graphic 804*a* (each of which indicate a liquid product of a fluid type that does not match the fluid type of the first distribution tank 170*a*). For example, in some embodiments, the third tank compartment graphic 804*c* may be graphically distinguished from the other tank compartment graphics by shading the other tank compartment graphics (i.e., second tank compartment graphic 804*b* and first tank compartment graphic 804*a*) darker, though in other embodiments, the tank compartment graphics may be graphically distinguished through textures or other graphical distinctions.

In some embodiments, the tank delivery connector may read a tank tag with the tank tag reader and may transmit a tank tag indicator associated with the tank tag with network interface hardware in response to determining that the tank delivery connector is upright and determining that the tank delivery connector is locked onto a distribution tank.

In some embodiments, it may be desirable to allow a user to bypass the crossover protection features of the product delivery vehicle system 100, such as embodiments in which one or more of the system components or subsystems systems is malfunctioning or damaged or embodiments in which a tank tag is missing from a distribution tank, etc. When a user bypasses the crossover protection features of the product delivery vehicle system 100, it may be desirable to display a graphical indication of information relative to system operation in the bypass mode. For example, in some embodiments, the user may be presented with a bypass prompt graphical user interface, which may be a separate screen or a pop-up screen. The bypass prompt graphical user interface may be displayed in response to receiving user input indicative of a desire to deliver liquid product from a tank compartment without regard to whether the system determines that it is appropriate to deliver the liquid product from the tank compartment 104 (e.g., the system may not detect a match between the fluid type of liquid product in the tank compartment 104 and the liquid type indicated by a tank tag read by a delivery connector that is locked onto a distribution tank, as described above, which would require a bypass to deliver the liquid product from the tank compartment 104 to the distribution tank 170 onto which the tank delivery connector 150 is locked). In some embodiments, the graphical user interface may include a bypass button and a dismiss button. Upon selecting the dismiss button, the system may return to a normal operating condition and the system may not enter a bypass mode. Upon selecting the bypass button, the system may enter a bypass mode in which liquid product may be delivered from a specific tank compartment. Some embodiments may require a user to enter a bypass passcode before allowing or authorizing a bypass.

Referring to FIGS. 8-10, in some embodiments, the graphical user interface 800 may include a fault indicator 860. If the product delivery vehicle system 100 detects a fault condition, the fault indicator 860 may be displayed on the graphical user interface 800. Faults that may trigger the display of the fault indicator 860 include a multi-tank-connector fault (two tank delivery connectors are locked onto distribution tanks at the same time without liquid product flowing through either tank delivery connector); a tank compartment handle fault, a fuel sensor component fault, an override compartment fault, a tank delivery connector communication fault, a fuel sensor count fault, or the like. In some embodiments, when a user selects the displayed fault indicator 860, one or more dialog boxes including information about the detect fault or faults may be displayed on the display 144.

Referring now to FIG. 10, in some embodiments, the graphical user interface 800 may also include a retain indicator 870. When the product delivery vehicle system 100 detects that the internal valve 116 or the control valve 110 for a tank compartment 104 has been closed but the electronic control unit 130 is still receiving a signal indicating that liquid product is present in the tank compartment 104, the graphical user interface 800 may display the retain indicator 870 proximate to the tank compartment graphic 804 corresponding to the tank compartment 104 having the retained liquid product. The produce delivery vehicle system 100 may also record a retain fault in the event log or fault log of the system. A retain fault may also be generated by loss of air pressure during unloading, which may cause the solenoid valves 120 to close, thereby closing the corresponding internal valves 116. For example, in FIG. 10, the third solenoid valve indicator 810c may indicate that the third solenoid valve 120c is open thereby indicating that the third internal valve 116c is open. If the operator closes the third control valve 110c before all of the liquid product has been transferred out of the third tank compartment 104c to the distribution tank 170, the flow of liquid product from the third tank compartment 104c will cease, but a volume of liquid product will remain in the third tank compartment 104c. This retained volume of liquid product may cause the third FPS 106c to continue to provide a liquid type signal to the electronic control unit 130. Additionally, in some embodiments, the third pressure sensor 108c may also send a signal indicating that liquid product remains in the third tank compartment 104c. Alternatively or additionally, in some embodiments, the third overfill sensor 210c may provide a level signal to the electronic control unit 130 to indicate that liquid product has been retained in the third tank compartment 104c. Having detected that the third control valve 110c has been closed but liquid product remains in the third tank compartment 104c, the electronic control unit 130 may cause the graphical user interface 800 to display the retain indicator 870 proximate to the third tank compartment graphic 804c to warn the operator that liquid product remains in the third tank compartment 104c.

As shown in FIGS. 8-10, the graphical user interface 800 may include a menu button 840, which may be operable to display a menu graphical user interface on the display 144.

Referring to FIG. 11 in conjunction with FIGS. 1-3, the menu graphical user interface 900. The menu graphical user interface 900 may provide a plurality of buttons to allow the operator to view information collected and/or stored by the product delivery vehicle system 100 and to change various settings or parameters of the product delivery vehicle system 100. The menu graphical user interface 900 may include one or more of a bypass button 902, an asset management button 904, a fault log button 906, a system information button 908, a settings button 910, a device list button 912, a system diagnostics button 914, or other buttons. In some embodiments, the menu graphical user interface 900 may also include the main air indicator 808 to provide the status of the main air valve 204. In some embodiments, the menu graphical user interface 900 may have a back button 916 to return to a graphical user interface associated with loading or unloading.

In some embodiments, the bypass button 902 may include a bypass status indicator to indicate when the system is in bypass mode (e.g., a mode in which a user has bypassed or overridden the operation of the crossover protection features of the system in order to distribute fuel from a tank compartment of the product delivery vehicle 102). The bypass status indicator may use color, shape, patterns, text, or other graphical means to indicate whether the system is in bypass mode. In some embodiments, the bypass button 902 may toggle the system between the bypass mode and normal operation. Alternatively, in other embodiments, the bypass button 902 may direct the user to a bypass graphical user interface, where the operator may transition the system into and out of the bypass mode.

In some embodiments, the fault logs button 906 may cause a fault log graphical user interface to be displayed on the display. The fault log graphical user interface may provide a log of information on faults recorded by the product delivery vehicle system 100 during operation. For example, in some embodiments, the faults listed may include predictive faults that may indicate whether a component of the product delivery system is approaching the end of its expected useful life. The fault log graphical user interface may also log faults that arise from failure of one or more components to operate in response to control signals transmitted by the electronic control unit 130 or failure of one or more components to produce a signal capable of being received by the electronic control unit 130. Other faults may also be logged. In some embodiments, the system information button 908 may cause a system information graphical user interface to be displayed on the display. The system information graphical user interface may include identification and reference information for one or more of the software, processor, memory modules, display, microphone, speakers, network interface hardware, user input hardware, or other component of the system.

The settings button 910 may allow a user to view a settings graphical user interface, such as when a signal indicative of a selection of the settings button 910 is received from the user input device 138, from the display 144 (when the display 144 is a touchscreen), from the microphone 140, or the like. In some embodiments, the settings graphical user interface may allow a user to set various system settings, such as to set a number of tank compartments on the product delivery vehicle 102, to set a date and time, to set a bypass lock, to view a list of tank delivery connectors (also known as "smart elbows") paired with the system, to set a master passkey, to set a system network name, or to set other settings of the system. In some embodiments, the settings graphical user interface may include a settings screen that may allow more or less information to be viewed or more or less settings to be manipulated. In some embodiments, the system may not include a settings graphical user interface.

In some embodiments, the settings graphical user interface may enable the operator to provide input indicative of a number of tank compartments included in the product delivery vehicle, and a signal indicative of the input number of tank compartments may be received from the user input device 138, from the display 144 (when the display 144 is a touchscreen), from the microphone 140, or the like. In some embodiments, electronic control unit 130 may compare the number of tank compartments input by the user to a number of fluid property sensors included within the product delivery vehicle system 100. When the number of tank compartments input by the user does not match the number of fluid property sensors included within the product delivery vehicle system 100, an error graphical user interface may be displayed on the display 144. The error graphical user interface may include a change compartments count button (which may cause the graphical user interface to be displayed again upon user selection) and a dismiss button (which may cause the mismatch to be ignored and may cause a settings graphical user interface to be displayed on the display 144).

In some embodiments, the device lists button 912 may cause a device list graphical user interface to be displayed on the display 144. The device list graphical user interface may provide identification and parameter information for each of the components of the product delivery vehicle system, such as the FPS 106, the overfill sensors 210, the pressure sensors 108, the control valves 110, the control valve sensors 112, hose tag readers 114, internal valves 116, solenoid valves 120, solenoid valve sensors 122, main air valve 204, main air valve actuator 205, tag reader unit 250, or other component. In some embodiments, the device list may include information on tank delivery connectors 150 that are currently paired to the product delivery vehicle system 100 or, in some cases, tank delivery connectors that are available to be paired. In some embodiments, the device list graphical user interface may provide current operational status and/or predictive maintenance information for each of the components of the system. For example, in some embodiments, the device list graphical user interface may include a service life indicator that may indicate whether a sensor, valve, or other component is reaching the end of its useful service life and may be expected to have an increased probability of failure.

In some embodiments, the system diagnostics button 914 may cause a system diagnostics graphical user interface to be displayed on the display 144. In some embodiments, the system diagnostics graphical user interface may show diagnostic and status information about various system components.

In some embodiments, the asset management 904 may cause an asset management graphical user interface to be displayed on the display 144. The asset management graphical user interface may provide performance data for the product delivery vehicle 102 and product delivery vehicle system 100 calculated from event logs produced and stored by the electronic control unit 130. The electronic control unit 130 may maintain and store information on events that occur during operation of the product delivery vehicle system 100. An event may include any one of the operations for any of the system components described in this disclosure, for example, events may include opening or closing of valves (e.g., main air valve 205, solenoid valve 120, internal valve 116, control valve 110), receiving tag information from a tag reader, connecting delivery hoses 190, locking the tank delivery connector 150 to a distribution tank 170, receiving an overfill condition signal, connecting a socket, connection a vapor adaptor connection, opening a tank vent, starting or stopping forward motion of the vehicle, retain warning, bypassing the cross-contamination protection features of the system, determination or entry of the transported liquid type, determination that a tank compartment is empty, or other event. The electronic control unit 130 may time stamp each event during operation of the product delivery vehicle and may store the event information in the memory module in the form of an event log. The electronic control unit 130 may include conventional event logging modules and protocols, including associated machine instructions for logging the event information.

In some embodiments, the electronic control unit 130 may include machine instructions that, when executed by the processor, cause the electronic control unit to retrieve one or more event log entries from the event log stored in the memory module and calculate one or more performance metrics based on the event information maintained in the event log. In some embodiments, the electronic control unit 130 may automatically calculate one or more of the performance metrics upon the occurrence of one or a plurality of specific events and may store the calculated performance metric in the memory module. Alternatively, in some embodiments, the electronic control unit 130 may receive a user input from the user input hardware 138 to calculate a performance metric, and in response to the user input, the electronic control unit 130 may then retrieve one or more event log entries from the event log and calculate the performance metric. For example, in some embodiments, the operator may navigate to the asset management graphical user interface from the menu graphical user interface 900 and may select a performance metric from a list of performance metrics provided on the asset management graphical user interface. After receiving the user input from the asset management graphical user interface, the electronic control unit 130 may then determine which event logs need to be retrieved, retrieve the event log information from the memory module, and calculate the performance metric. The electronic control unit 130 may display the calculated performance metric on the display 144. Alternatively, in some embodiments, the electronic control unit 130 may output the performance metric data to a data file or transmit the performance metric data to another processing system, such as a central logistics system for a product delivery company operating the product delivery vehicle. In some embodiments, the electronic control unit 130 may output the performance metrics to an asset management portal, which may be a webpage or an application run on a personal computer, for example.

Performance metrics may include, but are not limited to average vehicle load time per vehicle, average tank compartment load time per vehicle, average compartment load time per compartment, average vehicle delivery time per vehicle, average compartment delivery time per vehicle, average compartment delivery time per compartment, average vehicle flow time per vehicle, average compartment flow time per vehicle, average compartment flow time per compartment, average vehicle idle time per vehicle, average compartment idle time per vehicle, average compartment idle time per compartment, number of bypasses per compartment, number of bypasses per vehicle, number of retain warnings per compartment, number of retain warnings per truck, number of overfill warnings/faults per compartment, number of overfill warnings/faults per truck, fluid type of each compartment per load, temperature of fuel of each compartment per load, detailed timeline view of each load/unload event, or other performance metric.

In some embodiments, a vehicle unload/load event may be classified as a time elapsed between the time the main air is turned ON (i.e., the main air valve 205 opened) and the time the main air is turned OFF (i.e., the main air valve 205 closed). It is only during this time that the vehicle may be able to unload/load. In some embodiments, the electronic control unit 130 may determine whether the event is an unload or a load event by checking if any socket reports a connection. If any socket is reporting a connection when the main air is turned on or at any time a socket reports a connection during the unload/load event, the electronic control unit 130 may classify the event as a load event. If the main controller never indicates the event as a load event then the event should be marked as an unload event by default. An unload event may include any number of compartments opening and/or closing during the unload event and could have compartments open and close multiple times during the unload event.

In some embodiments, the electronic control unit 130 may define a vehicle delivery time as a total time that the vehicle is in a state that it is able to unload one or more tank compartments. As previously described, the vehicle may be able to deliver only when the main air is turned ON (i.e., the main air valve 205 is in the open configuration). The vehicle delivery time may be calculated as the time that elapses from the time the main air is turned ON to the time the main air is turned OFF, when the event is an unload event. In some embodiments, the electronic control unit 130 may define a compartment delivery time for one specific tank compartment to be the total time that the tank compartment is open during an unload event. The compartment delivery time may be calculated to be the time elapsed from the time the internal valve and control valve for the tank compartment are both opened to the time when either the control valve or the internal valve are closed. If the tank compartment is opened and closed multiple times during a single unload event, then each time duration that the tank compartment is opened may be added together to get the total compartment delivery time.

In some embodiments, the electronic control unit 130 may classify the vehicle flow time as the total time that at least one tank compartment is open (i.e., both the control valve and internal valve are open) with product flowing from the tank compartment (i.e., the tank compartment is not reporting as empty, such as by the electronic control unit 130 continuing to receive a fluid property signal from the FPS, for example). In some embodiments, the electronic control unit 130 may classify a compartment flow time as the total time that a specific tank compartment is open with product flowing (i.e., the specific tank compartment not reporting as empty). In some embodiments, each compartment may have its own compartment flow time calculated by the electronic control unit 130.

In some embodiments, the electronic control unit 130 may calculate a vehicle idle time as the total time that no product is flowing from any tank compartment (i.e., no tank compartment is open, or a tank compartment is open, but indicated as being empty) during an unload event. If a compartment is open but reporting as empty, that time may be included in the calculation of the vehicle idle time. In some embodiments, the electronic control unit may calculate the compartment idle time as the total time that a compartment is reporting that it is open but there is no product flowing (i.e, the tank compartment is reporting that it is empty).

It should now be understood that embodiments described herein include graphical user interfaces displayed on display screens of crossover protection systems that mitigate the risk of potential crossover and allow an operator of the product delivery vehicle and crossover protection system to deliver multiple types of fuel or other liquid to distribution tanks at a distribution facility in a quick and efficient manner while mitigating the risk of crossover. Furthermore, the graphical user interfaces described herein may allow a user of a crossover protection system to easily and quickly ascertain information pertaining to the fuel types loaded in the various compartments of a fuel delivery vehicle and to easily and quickly ascertain the status of various system components.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A product delivery vehicle system comprising:
  a product delivery vehicle comprising at least one tank compartment;
  an internal valve fluidly coupled to the at least one tank compartment, wherein the internal valve has a normally closed configuration;
  a control valve fluidly coupled to the internal valve, the control valve operable to control a flow of liquid product from the at least one tank compartment;
  an air system comprising a main air valve, an actuator operatively coupled to the main air valve and operable to transition the main air valve from a normally closed position to an open position, and at least one solenoid valve fluidly coupled to the main air valve and to the internal valve, the solenoid valve operable to deliver compressed air to the internal valve to transition the internal valve from a normally closed configuration to an open configuration;
  an electronic control unit comprising a processor, a memory module communicatively coupled to the processor, and machine readable instructions stored in the at least one memory module, wherein the electronic control unit is communicatively coupled to the control valve, the actuator of the main air valve, and the at least one solenoid valve;

a tank tag reader operable to read a tank tag and transmit a tank tag indicator associated with the tank tag, the tank tag indicator indicative of a stored liquid type in a distribution tank;

wherein the machine readable instructions, when executed by the processor, cause the electronic control unit to perform at least the following:

receive the tank tag indicator;

determine a stored liquid type associated with a distribution tank based on the tank tag indicator;

compare the stored liquid type to a transported liquid type of a liquid product stored in the tank compartment;

maintain the internal valve in the normally closed configuration when the stored liquid type and the transported liquid type do not match to prevent the flow of liquid product to or from the tank compartment; and when the stored liquid type and the transported liquid type match, receive a user input from the user input device to open the internal valve and transmit an open internal valve signal to the solenoid valve to transition the internal valve from the normally closed configuration to an open configuration, thereby permitting the flow of liquid product to or from the tank compartment.

2. The product delivery vehicle system of claim 1, further comprising a display and a user input hardware communicatively coupled to the electronic control unit.

3. The product delivery vehicle system of claim 2, wherein the display and the user input device comprise a touch screen.

4. The product delivery vehicle system of claim 1, wherein the machine readable instructions, when executed by the processor, cause the electronic control unit to perform at least the following:

receive a user input from a user input hardware to open the main air valve; and transmit an open signal to the main air valve to transition the main air valve from a normally closed configuration to an open configuration.

5. The product delivery vehicle system of claim 1, further comprising at least one overfill sensor coupled to the tank compartment and communicatively coupled to the electronic control unit, the at least one overfill sensor operable to determine an overfill condition of the tank compartment, a liquid level in the tank compartment or both, and transmit an overfill signal, a signal indicative of the liquid level in the tank compartment, or both.

6. The product delivery vehicle system of claim 5, wherein the machine readable instructions, when executed by the processor, cause the electronic control unit to receive the overfill signal from the at least one overfill sensor during a loading operation, and change an output signal to the solenoid valve to cause the solenoid valve to transition the internal valve from the open configuration to the normally closed configuration.

7. The product delivery vehicle system of claim 1, further comprising a tank delivery connector fluidly coupleable to a distribution side of the control valve, the tank delivery connector comprising the tank tag reader for interrogating the tank tag, wherein the tank tag is coupled to a distribution tank and transmitting to the system controller the stored liquid type signal indicative of the stored liquid type of the distribution tank.

8. The product delivery vehicle system of claim 7, wherein the tank delivery connector further comprises:

a lock mechanism coupled to the tank delivery connector and comprising a locking lever with a locked position and an unlocked position, the lock mechanism mechanically securing the tank delivery connector to the distribution tank; and a lock sensor mechanically coupled to the lock mechanism and electrically coupled to the tank tag reader, wherein the lock sensor provides the tank tag reader with a delivery connector locked signal when the locking lever is in the locked position and the tank tag reader transmits the delivery connector locked signal to the system controller when the tank delivery connector is secured to the distribution tank.

9. The product delivery vehicle system of claim 1, wherein the control valve has a normally locked state, wherein the machine readable instructions, when executed by the processor, cause the electronic control unit to perform the following:

maintain the control valve in the normally locked state when the stored liquid type and the transported liquid type do not match to prevent the flow of liquid product from the tank compartment; and transition the valve from the normally locked state to an unlocked state when the stored liquid type and the transported liquid type match, thereby permitting the flow of liquid product from the tank compartment.

10. The product delivery vehicle system of claim 1, further comprising a fluid property sensor positioned to contact the liquid product stored in the tank compartment.

11. The product delivery vehicle system of claim 10, wherein the machine readable instructions, when executed by the processor, cause the electronic control unit to perform the following:

receive a transported fluid property signal from the fluid property sensor, the transported fluid property signal being indicative of at least one of a viscosity, density, dielectric constant, and temperature of the liquid product in the tank compartment; and determine a transported liquid type of the liquid product in the tank compartment based on the transported fluid property signal.

12. The product delivery vehicle system of claim 1, wherein the machine readable instructions, when executed by the processor, cause the electronic control unit to display the transported liquid type on a display.

13. The product delivery vehicle system of claim 1, further comprising at least one solenoid valve sensor positioned proximal to the at least one solenoid valve and operable to determine whether the at least one solenoid valve is in an open configuration or a closed configuration and transmit a solenoid valve status indicator.

14. The product delivery vehicle system of claim 1, wherein the machine readable instructions, when executed by the processor, cause the electronic control unit to display a graphical user interface on a display, the graphical user interface comprising:

a schematic representation of the product delivery vehicle, the schematic representation including at least one tank compartment graphic depicting the at least one tank compartment of the product delivery vehicle; and a solenoid valve input graphic associated with the at least one tank compartment graphic, the solenoid valve input graphic operable to display a current status of the at least one solenoid valve and receive a user input to open or close the at least one solenoid valve.

15. The product delivery vehicle system of claim 14, wherein the graphical user interface further comprises a main air valve graphic operable to display a current status of the main air valve and receive a user input to open or close the main air valve.

16. The product delivery vehicle system of claim 14, wherein the graphical user interface includes a retain warning, wherein the graphical user interface may display the retain warning when the product delivery vehicle system detects liquid product remaining in the tank compartment after the control valve or the internal valve of the tank compartment has been closed.

17. The product delivery vehicle system of claim 1, further comprising a user input hardware, a graphical user interface, or both, and wherein the machine readable instructions, when executed by the processor, cause the electronic control unit to disable at least a portion of the user input hardware, at least a portion of the graphical user interface, or both, when the stored liquid type and the transported liquid type do not match to prevent an operator from opening the internal valve.

18. The product delivery vehicle system of claim 1, wherein the machine readable instructions, when executed by the processor, cause the electronic control unit to maintain the internal valve in the normally closed configuration when one or a plurality of preconditions are not satisfied, wherein the preconditions comprise one or a plurality of the following:
   an electrical ground is established;
   an electrical connector is coupled to a socket of the product transport vehicle;
   an overfill sensor is not transmitting an overfill condition signal;
   the main air valve is open;
   a vapor adaptor connection of a vapor recovery system is connected to the tank compartment; or
   a vent of the tank compartment is open.

19. The product delivery vehicle system of claim 18, wherein the machine readable instructions, when executed by the processor, cause the electronic control unit to receive a user input from the user input device to open the internal valve and transmit an open internal valve signal to the solenoid valve to transition the internal valve from the normally closed configuration to an open configuration, thereby permitting the flow of liquid product to or from the tank compartment, when the stored liquid type and the transported liquid type match and all of the preconditions are satisfied.

20. The product delivery vehicle system of claim 18, wherein the machine readable instructions, when executed by the processor, cause the electronic control unit to:
   display a graphical user interface on a display, the graphical user interface comprising a loading precondition indicator having one or more of a ground status indicator, a socket indicator, an overfill condition indicator, a main air on indicator, a vapor adaptor indicator, or a vent indicator; and
   change a color of one or more of the ground status indicator, the socket indicator, the overfill condition indicator, the main air on indicator, the vapor adaptor indicator, or the vent indicator when the corresponding precondition is satisfied.

\* \* \* \* \*